United States Patent
Kaizu et al.

(10) Patent No.: US 9,898,942 B2
(45) Date of Patent: Feb. 20, 2018

(54) HANGING-STRAP INFORMATION DISPLAY DEVICE

(71) Applicant: Mitsubishi Electric Corporation, Tokyo (JP)

(72) Inventors: Aki Kaizu, Tokyo (JP); Eiji Matsuo, Toyko (JP); Masashi Kamiya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/123,574

(22) PCT Filed: Jan. 19, 2015

(86) PCT No.: PCT/JP2015/051221
§ 371 (c)(1),
(2) Date: Sep. 2, 2016

(87) PCT Pub. No.: WO2015/136983
PCT Pub. Date: Sep. 17, 2015

(65) Prior Publication Data
US 2017/0076643 A1   Mar. 16, 2017

(30) Foreign Application Priority Data
Mar. 13, 2014  (JP) .................................. 2014-049922

(51) Int. Cl.
*H05K 5/00*   (2006.01)
*G09F 3/00*   (2006.01)
(Continued)

(52) U.S. Cl.
CPC .............. *G09F 7/22* (2013.01); *B60N 3/023* (2013.01); *G06F 1/16* (2013.01); *G06F 3/147* (2013.01);
(Continued)

(58) Field of Classification Search
CPC ..... G09F 7/22; G09F 7/18; G09F 9/30; G09F 9/35; G09F 23/00; G09F 23/04;
(Continued)

(56) References Cited

U.S. PATENT DOCUMENTS

| 8,947,869 B2 * | 2/2015 | Tsai ..................... H05K 7/1461 297/217.3 |
| 2005/0132622 A1 * | 6/2005 | Strong ..................... G09F 3/08 40/318 |

(Continued)

FOREIGN PATENT DOCUMENTS

| JP | 47-079749 S |   | 7/1972 |
| JP | 49-39103 S | * | 7/1972 |

(Continued)

OTHER PUBLICATIONS

Office Action dated Feb. 28, 2017 in counterpart JP Patent Application No. 2016-100075 with an English Translation.

*Primary Examiner* — Nidhi Thaker
(74) *Attorney, Agent, or Firm* — Birch, Stewart, Kolasch & Birch, LLP

(57) ABSTRACT

A hanging-strap information display device is a device provided in a hanging strap (10) including a hanging band part (11) hung in a movable body in a swingable manner and a hold part (12) provided on the hanging band part, and includes a display unit (14) disposed at a position that squarely faces a passenger that grips the hold part (12), a support shaft part (13) that supports the display unit (14) on the hanging band part (11) in a rotatable manner about a rotation center line, a weight (15) provided on a lower side in a vertical direction than the rotation center line of the display unit (14), and resonance reduction members (16, 17) that is connected between the hanging band part (11) and a (Continued)

position away from the rotation center line of the display unit (14) and reduces resonance of the display unit (14).

17 Claims, 30 Drawing Sheets

(51) Int. Cl.
| | |
|---|---|
| G09F 7/22 | (2006.01) |
| G09F 9/35 | (2006.01) |
| B60N 3/02 | (2006.01) |
| G09F 9/30 | (2006.01) |
| G09F 23/00 | (2006.01) |
| G09F 23/04 | (2006.01) |
| G06F 1/16 | (2006.01) |
| G09G 5/00 | (2006.01) |
| G09G 5/14 | (2006.01) |
| G09F 27/00 | (2006.01) |
| G09F 21/04 | (2006.01) |
| G06F 3/147 | (2006.01) |
| G09G 3/00 | (2006.01) |
| G09F 7/18 | (2006.01) |
| G09F 7/00 | (2006.01) |
| G09G 3/34 | (2006.01) |

(52) U.S. Cl.
CPC .............. *G09F 9/30* (2013.01); *G09F 9/35* (2013.01); *G09F 21/04* (2013.01); *G09F 23/00* (2013.01); *G09F 23/04* (2013.01); *G09F 27/005* (2013.01); *G09G 3/001* (2013.01); *G09G 5/00* (2013.01); *G09G 5/003* (2013.01); *G09G 5/14* (2013.01); *G09F 2007/005* (2013.01); *G09F 2007/186* (2013.01); *G09F 2007/1865* (2013.01); *G09G 3/3406* (2013.01); *G09G 2320/068* (2013.01); *G09G 2330/022* (2013.01); *G09G 2354/00* (2013.01)

(58) Field of Classification Search
CPC .......... G09G 5/003; G09G 5/14; B60N 3/023; G06F 1/16
USPC ........................................ 361/679.01; 40/318
See application file for complete search history.

(56) References Cited

U.S. PATENT DOCUMENTS

| | | | | |
|---|---|---|---|---|
| 2006/0081757 | A1* | 4/2006 | Okahara | B60R 11/0235 248/447 |
| 2010/0095567 | A1* | 4/2010 | Li | G09F 3/20 40/318 |
| 2010/0115809 | A1* | 5/2010 | Pacheco | B60N 3/023 40/318 |

FOREIGN PATENT DOCUMENTS

| | | | |
|---|---|---|---|
| JP | 9-97028 A | | 4/1997 |
| JP | 09097028 A | * | 4/1997 |
| JP | 2002-59772 A | | 2/2002 |
| JP | 2002059772 A | * | 2/2002 |
| JP | 2006-273269 A | | 10/2006 |
| JP | 2008-139616 A | | 6/2008 |
| JP | 2008139616 A | * | 6/2008 |
| JP | 2011-31799 A | | 2/2011 |

* cited by examiner

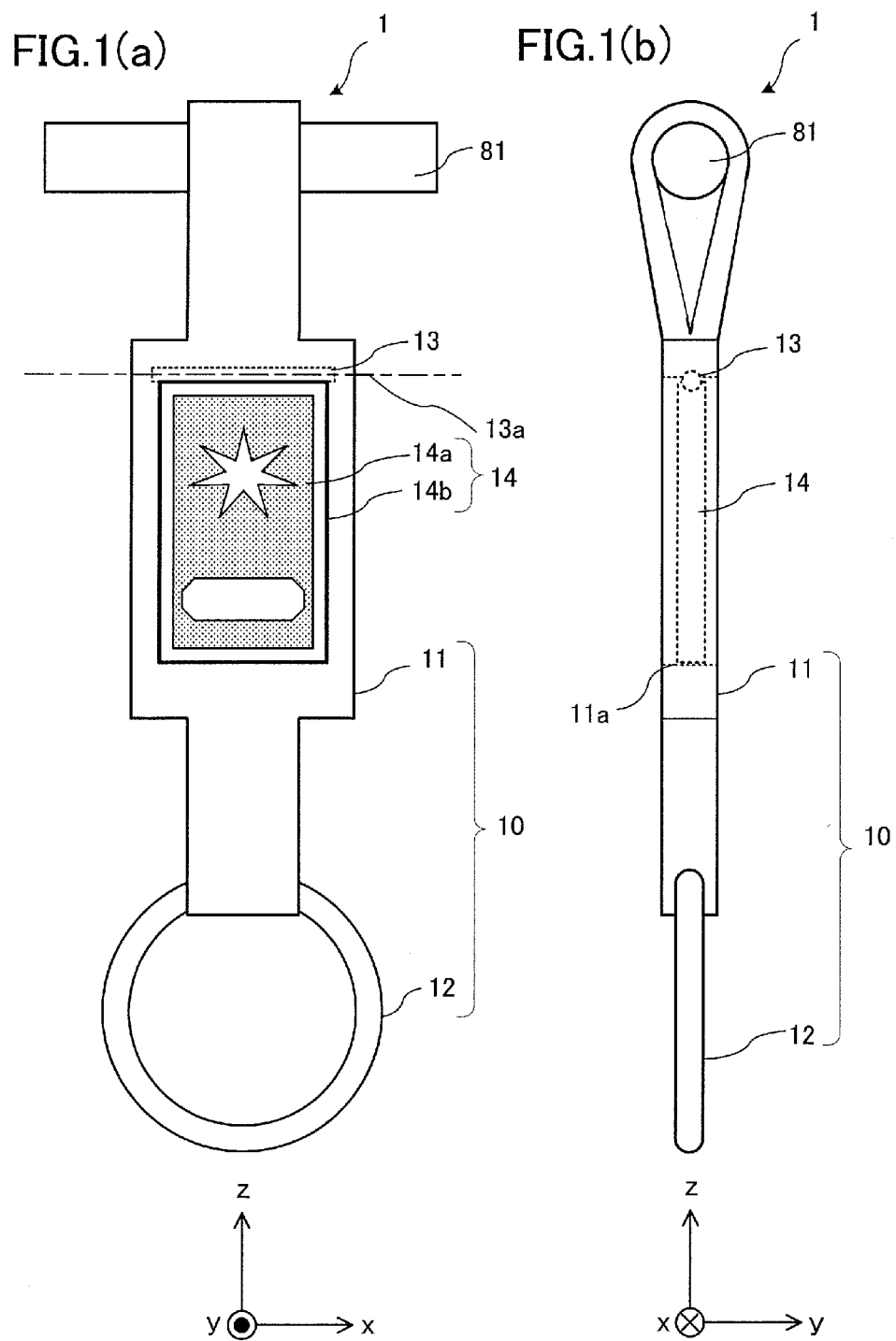

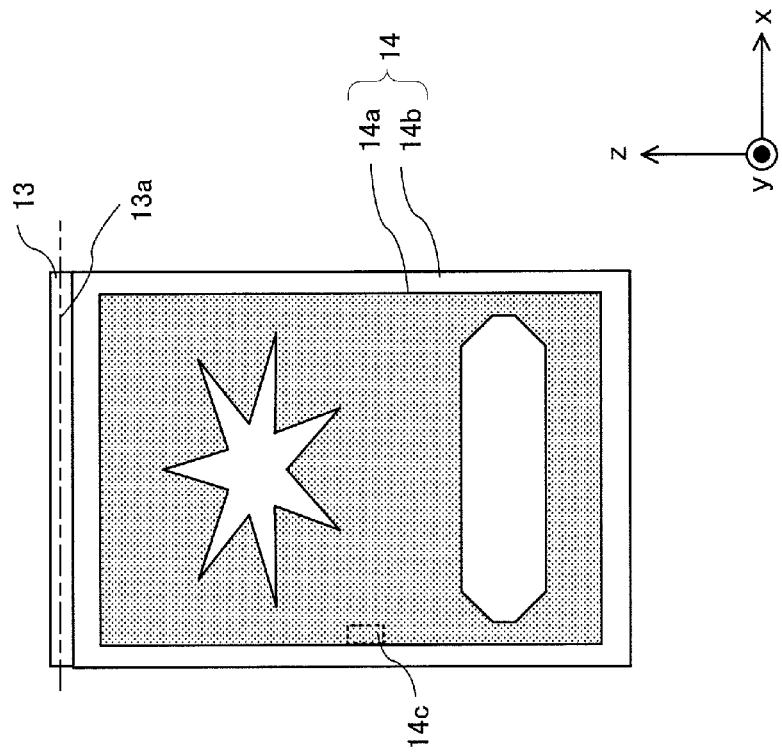
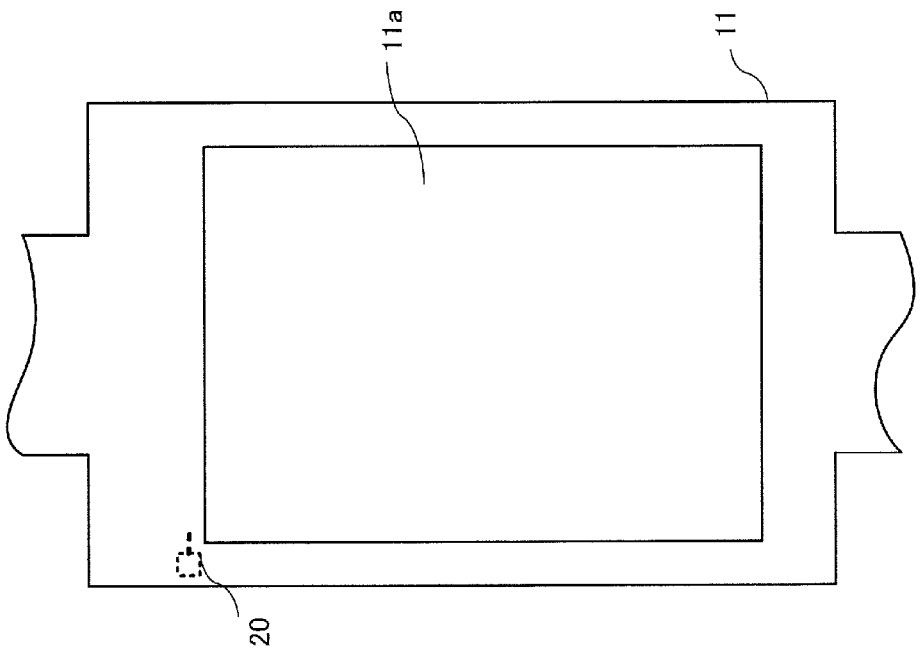

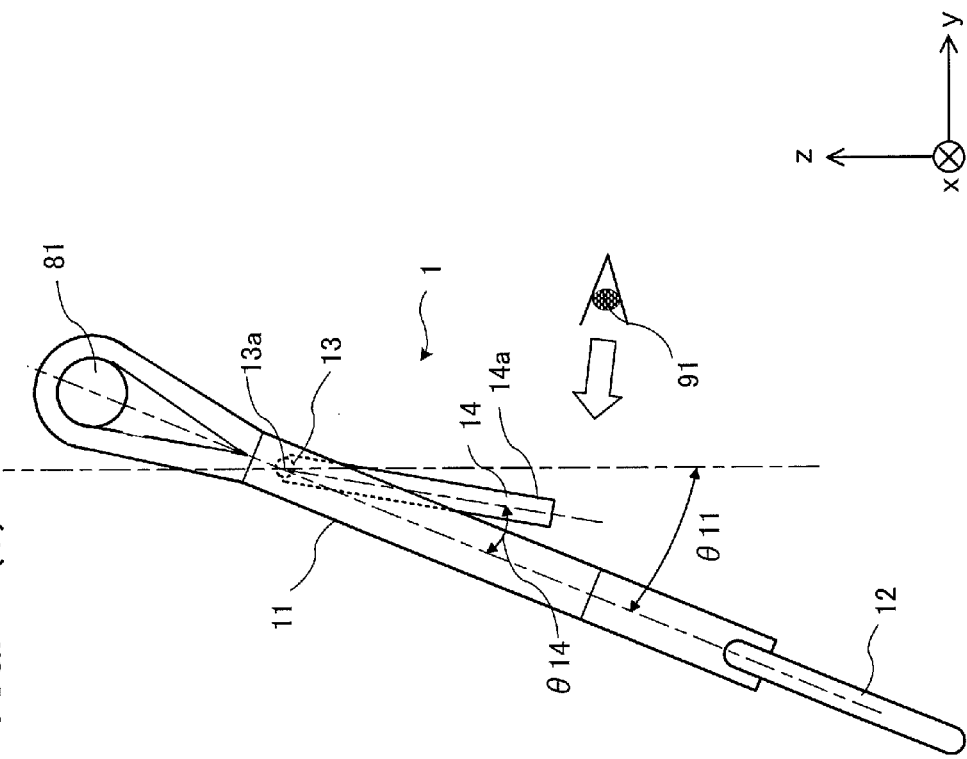
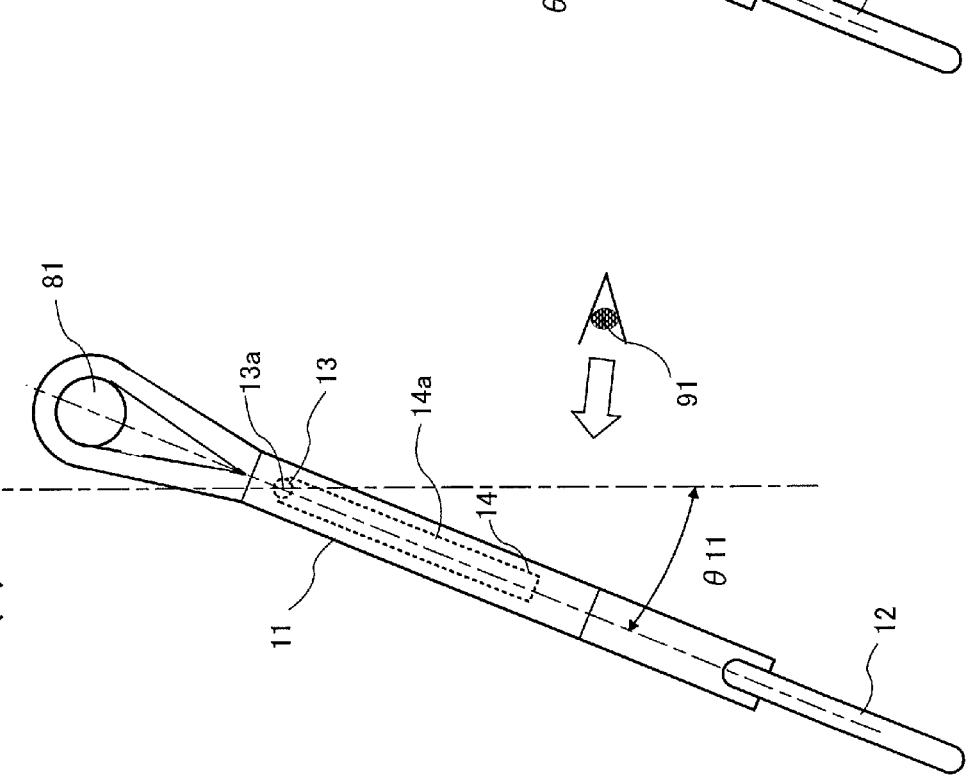

| | |
|---|---|
| 0.0: | + 10° |
| 0.1: | + 23° |
| 0.2: | + 28° |
| 0.3: | + 30° |
| 0.4: | + 28° |
| 0.5: | + 28° |
| 0.6: | + 29° |
| 0.7: | + 31° |
| 0.8: | + 30° |
| 0.9: | + 33° |
| 1.0: | + 32° |
| 1.1: | + 31° |
| 1.2: | + 30° |
| 1.3: | + 29° |
| 1.4: | + 28° |
| 1.5: − 18° |
| 1.6: − 15° |
| 1.7: − 16° |

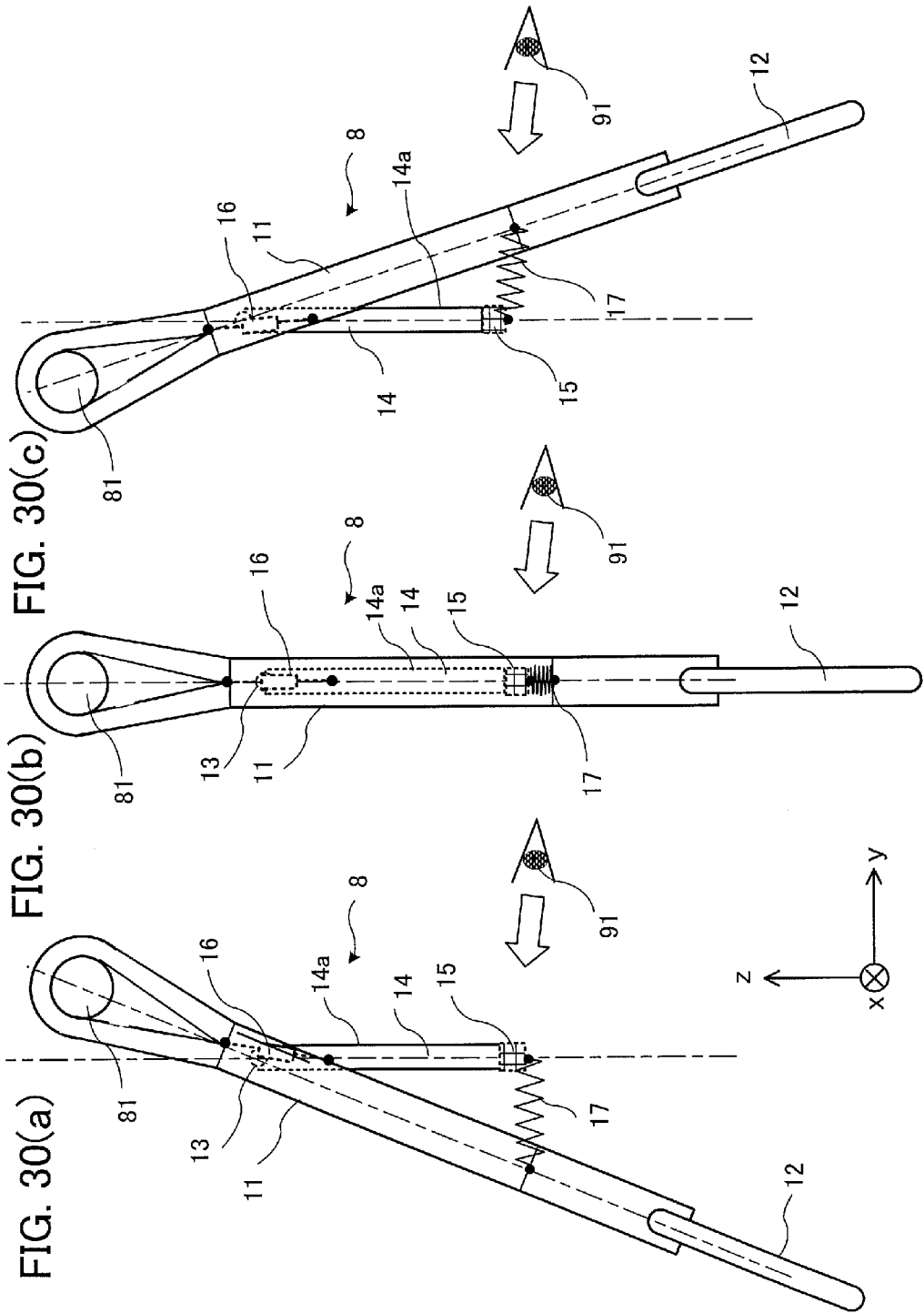

HANGING-STRAP INFORMATION DISPLAY DEVICE

TECHNICAL FIELD

The present invention relates to a hanging-strap information display device including a display unit in the hanging strap.

BACKGROUND ART

There is a proposal of a system and a device including a display unit for displaying information in a hanging strap provided in a movable body such as a vehicle of a public transportation such as an electric train or a bus. Patent reference 1 describes an information display system that displays information delivered from a server on a display unit provided integrally in a hanging strap which is gripped by a passenger.

Moreover, patent reference 2 describes a hanging-strap-integrated information display device that executes a control to display a character string displayed on an information display surface of a display unit while it is inclined in a direction opposite to a swing direction of a hanging strap, when the hanging strap swings and inclines to a left or a right, and as a result the information display surface of the display unit inclines to the left or the right, as seen from a passenger that squarely faces the information display surface of the display unit provided integrally in the hanging strap. According to the device of patent reference 2, even when the hanging strap swings and inclines to the left or the right as seen from the passenger, the passenger can continue visually recognizing the character string that is displayed on the information display surface of the display unit and aligns in a horizontal direction (does not incline).

PRIOR ART REFERENCE

Patent Reference

PATENT REFERENCE 1: Japanese Patent Application Publication No. 2008-139616
PATENT REFERENCE 2: Japanese Patent Application Publication No. 2011-31799

SUMMARY OF THE INVENTION

Problem to be Solved by the Invention

However, in patent references 1 and 2, the information display surface of the display unit is directed obliquely downward, when the hanging strap swings and inclines in a direction away from the passenger that squarely faces the information display surface of the display unit by how the passenger grips the hanging strap, how the vehicle inclines, and so on, and the information display surface of the display unit is directed obliquely upward, when the hanging strap swings and inclines in a direction of approaching the passenger that squarely faces the display unit. Hence, in patent references 1 and 2, there is a problem that a positional relationship between the information display surface of the display unit and eyes of the passenger becomes inappropriate, and visibility of an image on the information display surface decreases, when the hanging strap swings and inclines in the direction away from the passenger that squarely faces the information display surface of the display unit or the direction of approaching the passenger (these directions are also referred to as "depth direction".). Moreover, in a case where the passenger that views the image on the information display surface of the display unit moves his face according to the inclination of the information display surface of the display unit to maintain an appropriate positional relationship between the information display surface of the display unit and the eyes of the passenger, there is a problem that the passenger feels bothered.

Thus, the present invention is made to solve the problems of the above conventional arts, and its purpose is to provide a hanging-strap information display device which is capable of setting a direction of an information display surface of a display unit at an angle at which a passenger easily performs visual recognition, even when the hanging strap swings and inclines in a direction away from the passenger that squarely faces the information display surface of the display unit or in a direction of approaching the passenger.

Means for Solving the Problem

A hanging-strap information display device of one aspect of the invention is a hanging-strap information display device that is provided in a hanging strap including a hanging band part hung in a movable body in a swingable manner and a hold part provided on the hanging band part, and includes a display unit including an information display surface, a support shaft part that supports the display unit on the hanging band part in a rotatable manner about a rotation center line, a weight provided on a lower side in a vertical direction than the rotation center line of the display unit, and a resonance reduction member that is connected between the hanging band part and a position away from the rotation center line of the display unit, and reduces resonance of the display unit.

A hanging-strap information display device of another aspect of the invention is a hanging-strap information display device that is provided in the hanging strap including a hanging band part hung in a movable body in a swingable manner and a hold part provided on the hanging band part, and includes a display unit including an information display surface, a support shaft part that supports the display unit on the hanging band part in a tiltable manner about a rotation center line, a tilt drive unit that tilts the display unit about the rotation center line, an inclination degree sensor that detects an inclination degree of the hanging band part, the inclination degree being generated by swing motion in a depth direction that is orthogonal to both of a vertical direction and a longitudinal direction of the rotation center line, and a tilt control unit that decides an angle of the tilt of the display unit by the tilt drive unit on a basis of the inclination degree detected by the inclination degree sensor, and supply an instruction signal indicating the decided angle of the tilt to the tilt drive unit.

Effects of the Invention

According to the hanging-strap information display device of one aspect of the present invention, even when the hanging strap swings and inclines in the direction away from the passenger that squarely faces the information display surface of the display unit or in the direction of approaching the passenger, the display unit does not resonate but maintains a state of being hung vertically downward, and therefore can set the direction of the information display surface of the display unit at an angle at which the passenger easily performs visual recognition.

According to the present invention, when the hanging strap swings and inclines in the direction away from the passenger that squarely faces the information display surface of the display unit or in the direction of approaching the passenger, the display unit tilts according to an inclination degree of a hanging band part of the hanging strap, and therefore the direction of the information display surface of the display unit can be set at an angle at which the passenger easily performs visual recognition, even if the passenger does not move his face.

BRIEF DESCRIPTION OF THE DRAWINGS

FIGS. 1(a) and 1(b) are a front view and a side view schematically illustrating an exterior appearance of a hanging-strap information display device according to a first embodiment of the present invention.

FIGS. 2(a) and 2(b) are exploded views of the hanging-strap information display device according to the first embodiment, and FIG. 2(a) is a main part front view illustrating a hanging band part of the hanging strap, and FIG. 2(b) is a main part front view illustrating a display unit.

FIGS. 11(a) and 11(b) are side views illustrating an angle of a tilt of the display unit in a state in which the hanging-strap information display device according to the first embodiment swings and inclines in the direction away from the passenger.

FIG. 16 is a diagram illustrating an example of data that is temporarily stored in a buffer of the tilt control processing unit of the hanging-strap information display device according to the second embodiment.

FIGS. 30(a) to 30(c) are side views illustrating a tilt of the display unit in a state in which the hanging-strap information display device according to the eighth embodiment swings and inclines in the direction away from the passenger, in a state in which it does not incline, and in a state in which it swings and inclines in the direction of approaching the passenger.

MODE FOR CARRYING OUT THE INVENTION

First Embodiment

Figure 3:
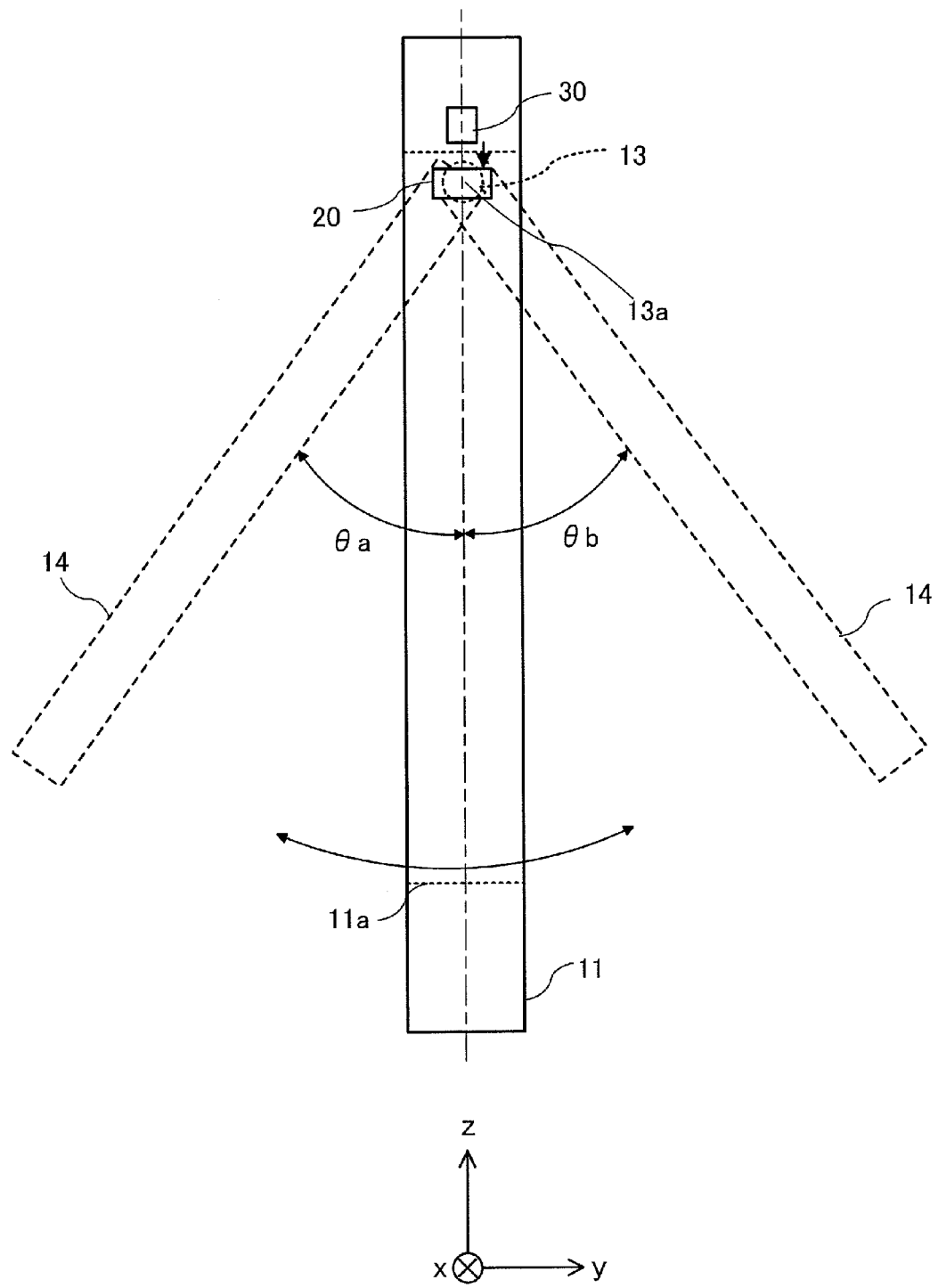
FIG. 3 is a side view illustrating tilt motion of the display unit of the hanging-strap information display device according to the first embodiment.
Figure 4A:
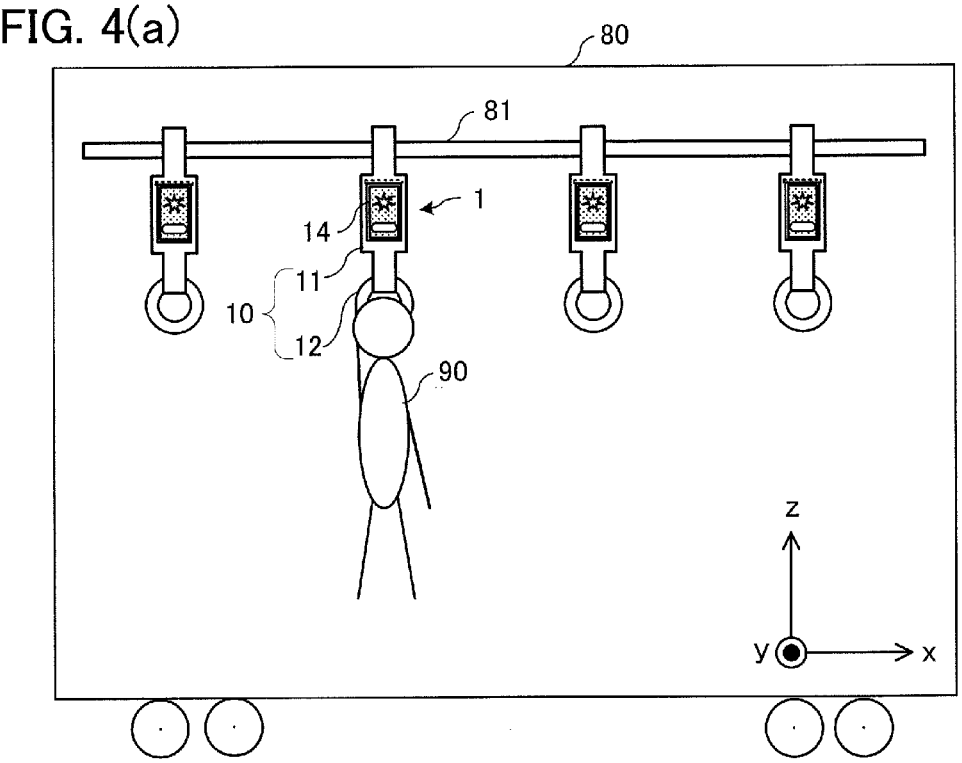
FIGS. 4(a) and 4(b) are diagrams schematically illustrating a positional relationship between the hanging-strap information display device according to the first embodiment and a passenger.
Figure 4B:
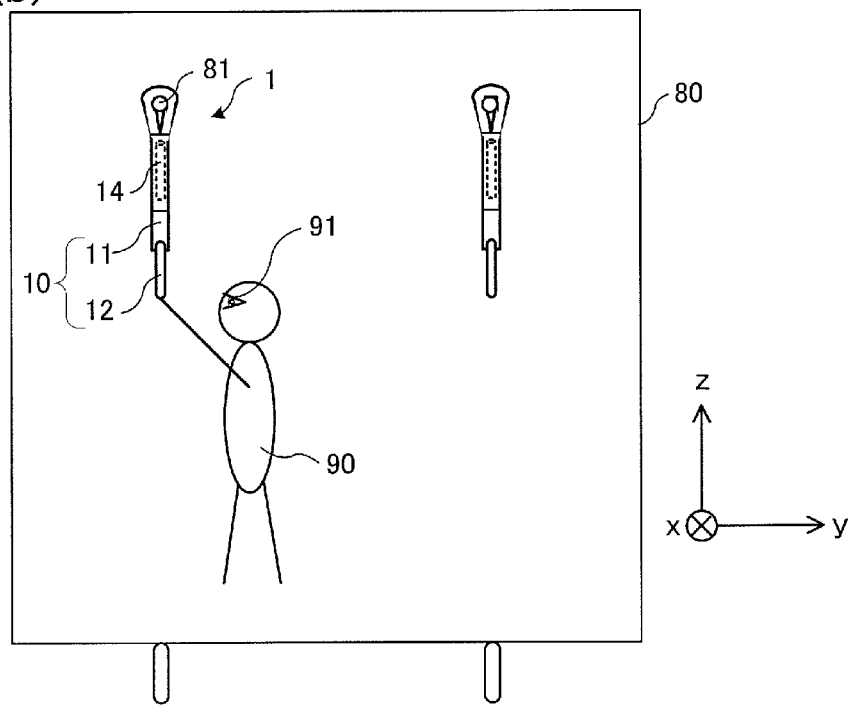

FIGS. 1(a) and 1(b) are a front view and a side view schematically illustrating an exterior appearance of a hanging-strap information display device 1 according to a first embodiment of the present invention. FIGS. 2(a) and 2(b) are exploded views of the hanging-strap information display device 1 according to the first embodiment, FIG. 2(a) is a main part front view illustrating a hanging band part 11 of the hanging strap 10, and FIG. 2(b) is a main part front view illustrating a display unit 14. FIG. 3 is a side view illustrating tilt motion of the display unit 14 of the hanging-strap information display device 1 according to the first embodiment. FIGS. 4(a) and 4(b) are diagrams schematically illustrating a positional relationship between the hanging-strap information display device 1 according to the first embodiment and a passenger 90. In an xyz orthogonal coordinate system in the drawings of the present application, an x axis is an axis that is parallel with a movement direction (a horizontal direction) of a vehicle 80 as a movable body, a y axis is an axis in a depth direction (a horizontal direction) that is orthogonal to the x axis, and a z axis is an axis in a vertical direction that is orthogonal to both of the x axis and the y axis. Moreover, a +x axis direction (an arrow direction) is a traveling direction of the vehicle 80, and a −x axis direction is a direction opposite to the +x axis direction. Moreover, a +y axis direction is a swing direction of the hanging strap 10 (a width direction of the vehicle 80 in the first embodiment) in which visibility of the passenger 90 is badly affected, and a −y axis direction is a direction opposite to the +y axis direction. Further, a +z axis direction represents a vertically upward direction, and a −z axis direction represents a vertically downward direction (a gravity force direction).

As illustrated in FIGS. 1(a) and 1(b), FIGS. 2(a) and 2(b), and FIG. 3, the hanging-strap information display device 1 according to the first embodiment is an information display device for a hanging strap 10 including the hanging band part 11 and a hold part (a grip part) 12 provided on the hanging band part 11. The hanging-strap information display device 1 includes the display unit (display device) 14 provided in an opening 11a provided in the hanging band part 11, and a support shaft part 13 that supports the display unit 14 in the hanging band part 11 in a tiltable (rotatable) manner about a rotation center line 13a. Moreover, as illustrated in FIGS. 4(a) and 4(b), the hanging band part 11 of the hanging strap 10 is hung on a support structural object 81 in the movable body 80 in a swingable manner. The display unit 14 includes an information display surface (an information display unit) 14a and a bezel (a frame body) 14b that surrounds this. In general, the information display surface 14a of the display unit 14 is disposed substantially at a position that squarely faces the passenger 90 that grips the hold part 12 of the hanging strap 10 (including a position that is a little higher than position of eyes 91 of the passenger 90).

Normally, the display unit 14 is a device that can display an image based on input image data (input signal). The image data may be input from a server device inside the vehicle or outside the vehicle by wire or wireless, and also may be stored in a memory unit provided in each of the display units 14 in advance. For example, the display unit 14 can be configured with any of a liquid crystal display device, an organic EL (electroluminescence) display device, and electronic paper that can electrically rewrite displayed content. Moreover, the display unit 14 may include a backlight 14c. If the display unit 14 is configured to be able to present an image to the passenger 90, the display unit 14 is not limited to the above illustrated devices, but may be other configurations.

The support shaft part 13 is a member having a longitudinal direction in the horizontal direction (x axis direction in the first embodiment). As illustrated in FIG. 3, the support shaft part 13 supports the display unit 14 in a swingable manner, in the opening 11a of the hanging band part 11 of the hanging strap 10. It is desirable that a swingable angle range be within a range from 90 degrees in the direction away from the passenger 90 (−y direction) (i.e., $\theta a = -90$ degrees) to 90 degrees in the direction of approaching the passenger 90 (+y direction) (i.e., $\theta b = +90$ degrees) in a case where a reference position is in the vertical direction (z axis direction). However, a swingable maximum angle may be a smaller value than 90 degrees. Moreover, the display unit 14 is configured to be able to get still at an arbitrary position within the range of the swingable maximum angle. For example, in the case of $\theta a = -90$ degrees and $\theta b = +90$ degrees, a swing angle $\theta$ of the display unit 14 is within the range from −90 degrees to 90 degrees.

Although a method in which the display unit 14 is fixed to the support shaft part 13 and the display unit 14 is swung by the rotation of the support shaft part 13 has been described as a method of supporting the display unit 14 in the hanging band part 11 in a swingable manner, a method of supporting the display unit 14 is not limited thereto. For example, the configuration that the support shaft part 13 is a fixed shaft and the display unit 14 is supported on the fixed shaft in a rotatable manner is also possible.

Figure 5:
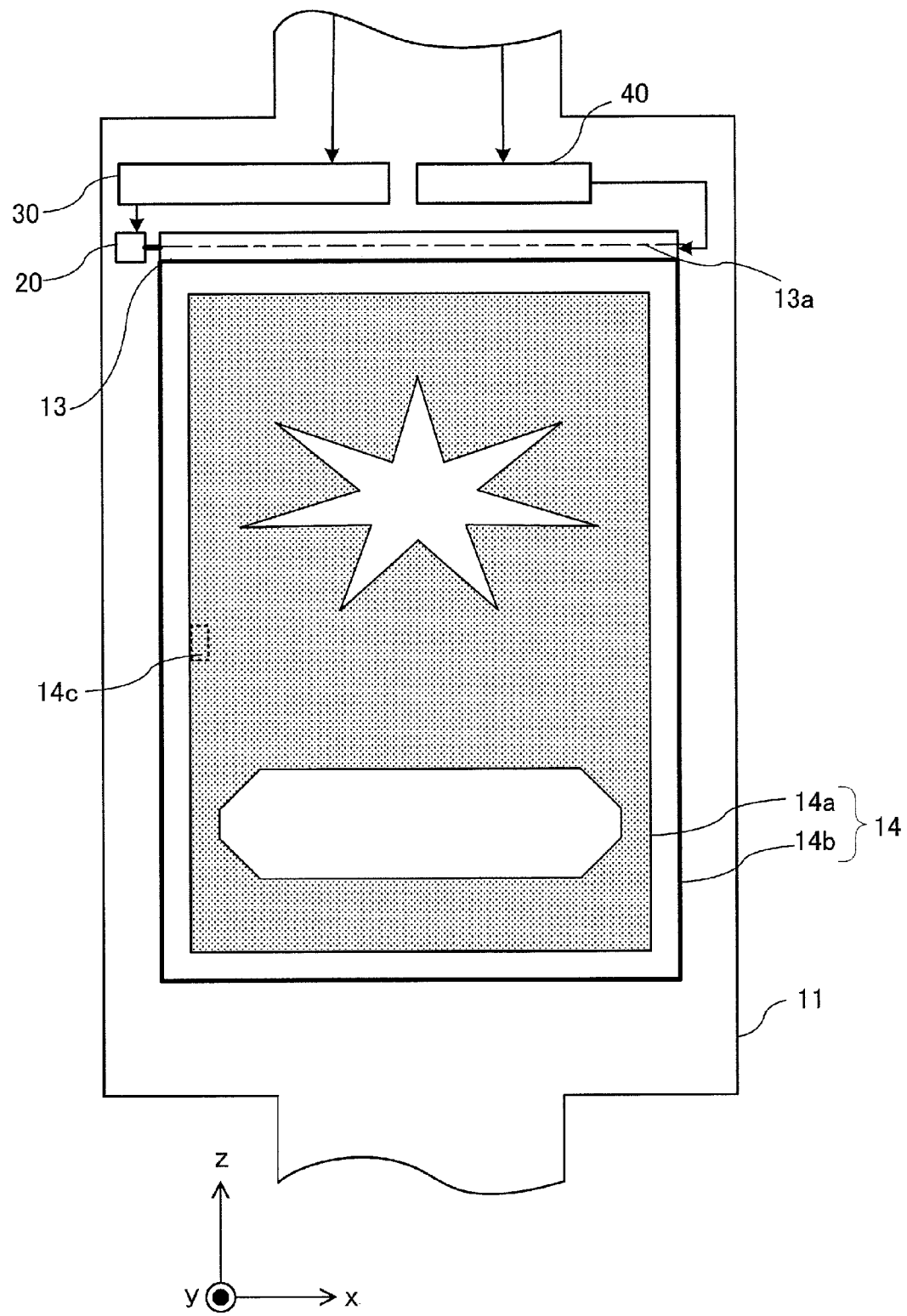
FIG. 5 is a main part front view schematically illustrating a configuration of the hanging-strap information display device according to the first embodiment.
Figure 6:
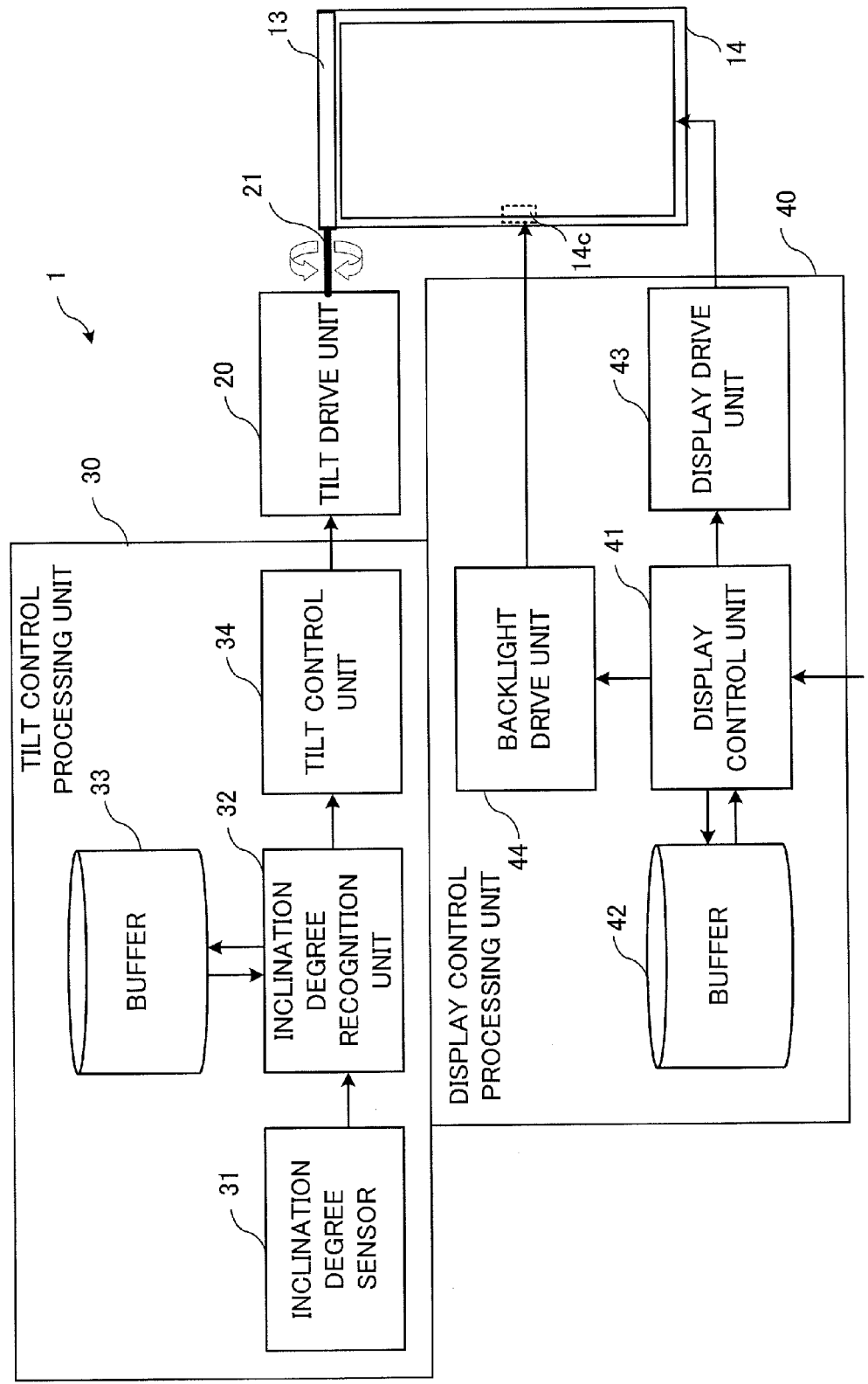
FIG. 6 is a block diagram schematically illustrating the configuration of the hanging-strap information display device according to the first embodiment.

FIG. 5 is a main part front view schematically illustrating a configuration of the hanging-strap information display device 1 according to the first embodiment. FIG. 6 is a block diagram schematically illustrating the configuration of the hanging-strap information display device 1 according to the first embodiment. As illustrated in FIGS. 5 and 6, the hanging-strap information display device 1 includes a tilt drive unit 20 such as a motor that tilts the display unit 14 within a predetermined angle range about the rotation center line 13a, and a tilt control processing unit 30 to detect an inclination degree of the hanging band part 11 of the hanging strap 10 which is generated by swing in the depth direction (y axis direction) that is orthogonal to both of the vertical direction and the longitudinal direction of the rotation center line 13a, decide an angle of a tilt of the display unit 14 by the tilt drive unit 20 on the basis of the detected inclination degree, and swing the display unit 14 to the decided angle of the tilt. Moreover, as illustrated in FIGS. 5 and 6, the hanging-strap information display device 1 may include a display control processing unit 40 that displays an image on the information display surface 14a of the display unit 14.

As illustrated in FIG. 6, the tilt control processing unit 30 includes an inclination degree sensor 31 that detects the inclination degree $\theta 11$ of the hanging band part 11, and a tilt control unit 34 that decides the angle of the tilt of the display unit 14 by the tilt drive unit 20 including a motor or the like on the basis of the inclination degree $\theta 11$ detected by the inclination degree sensor 31 and supplies an instruction signal indicating the decided angle of the tilt to the tilt drive unit 20. Moreover, as illustrated in FIG. 6, the tilt control processing unit 30 may include an inclination degree recognition unit 32 that analyzes a plurality of inclination degrees $\theta 11$ on the basis of a result of a plurality of times of detection of the inclination degree $\theta 11$ or performs computation based on a plurality of inclination degrees $\theta 11$, and a buffer 33 that stores a plurality of inclination degrees θ11 temporarily. The tilt control unit 34 receives the inclination degree θ11 and sends to the tilt drive unit 20 the instruction signal to rotate the support shaft part 13 by the angle according to the inclination degree θ11, and the tilt drive unit 20 rotates the rotation shaft 21 coupled with the support shaft part 13 in accordance with the received instruction signal. By this rotation, the display unit 14 tilts (rotates) in the direction away from the passenger 90 or the direction of approaching the passenger 90 (i.e., the depth direction) about the rotation center line 13a.

Figure 7:
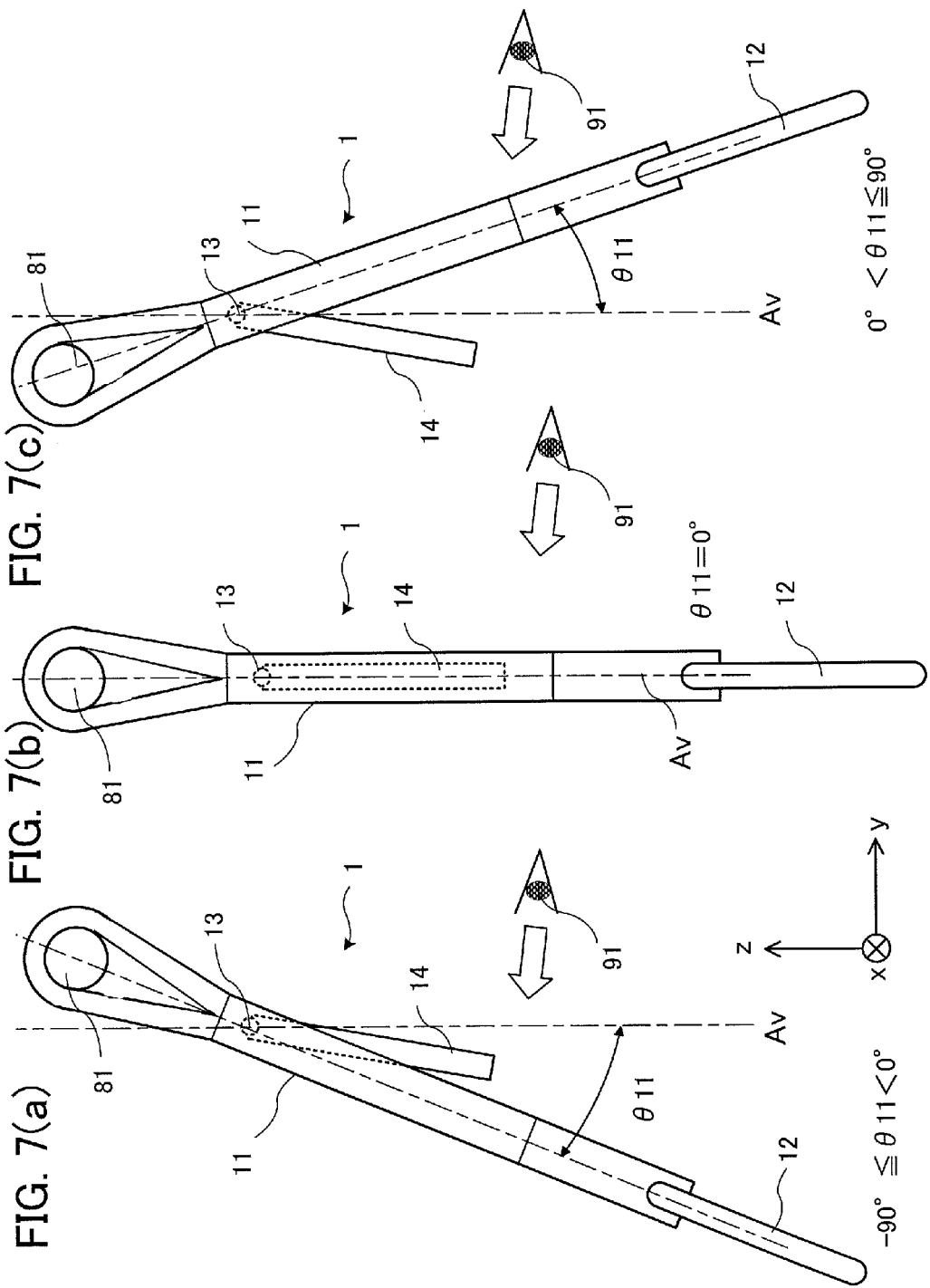
FIGS. 7(a) to 7(c) are side views illustrating a state in which the hanging-strap information display device according to the first embodiment swings and inclines in a direction away from a passenger, a state in which it does not incline, and a state in which it swings and inclines in a direction of approaching the passenger.

FIGS. 7(a) to 7(c) are side views illustrating a state in which the hanging-strap information display device 1 according to the first embodiment swings and inclines in the direction away from the passenger 90, a state in which it does not incline, and a state in which it swings and inclines in the direction of approaching the passenger 90. As illustrated in FIG. 7(c), the inclination degree θ11 of the passenger 90 side, which is an angle formed by a vertical axis Av in the vertical direction (z axis direction) and the hanging band part 11, is indicated by 0 degrees to +90 degrees. Moreover, as illustrated in FIG. 7(a), the inclination degree θ11 of the opposite side of the passenger 90, which is an angle formed by the vertical axis Av and the hanging band part 11, is indicated by 0 degrees to −90 degrees. Moreover, as illustrated in FIG. 7(b), in a case where the hanging band part 11 does not incline in the depth direction (y axis direction) but is positioned in the vertical direction, the inclination degree θ11 is expressed as 0 degrees. For example, in a case where θ11 is 20 degrees in the example of FIG. 7(c), the inclination degree θ11 of +20 degrees is generated in the hanging band part 11. Moreover, for example, in a case where θ11 is 25 degrees in the example of FIG. 7(a), the inclination degree θ11 of −25 degrees is generated in the hanging band part 11.

Figure 8:
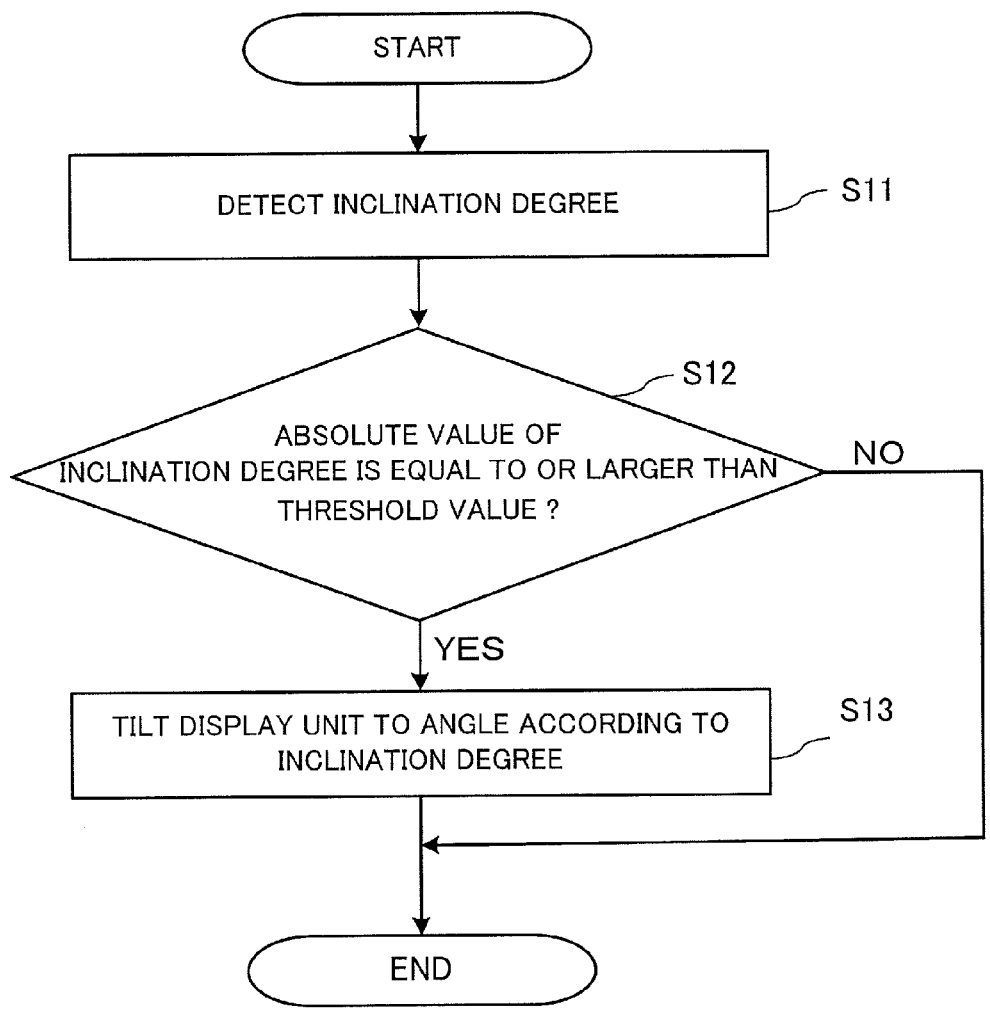
FIG. 8 is a flowchart schematically illustrating an example of operation of a tilt control processing unit of the hanging-strap information display device according to the first embodiment.

FIG. 8 is a flowchart schematically illustrating an example of operation of the tilt control processing unit 30 of the hanging-strap information display device 1 according to the first embodiment. In the example illustrated in FIG. 8, when the inclination degree sensor 31 detects the inclination degree θ11 of the hanging band part 11 of the hanging strap 10 (step S11), the inclination degree recognition unit 32 determines whether or not the absolute value of the inclination degree θ11 is equal to or larger than a predetermined threshold value Th (step S12). If the determination in step S12 is YES, the tilt control unit 34 sends to the tilt drive unit 20 an instruction signal to tilt the display unit 14 to an angle according to the detected inclination degree θ11, and the display unit 14 is tilted by an angle according to the instruction signal (step S13). Moreover, if the determination in step S12 is NO, the tilt control unit 34 does not send the instruction signal to the tilt drive unit 20, and ends the process.

For example, in a case where the inclination degree θ11 is +27 degrees and the threshold value Th is 10 degrees, the absolute value of the inclination degree is equal to or larger than the threshold value Th, and therefore the support shaft part 13 is rotated by the angle according to +27 degrees. As a simple method, when the hanging band part 11 swings in the direction of approaching the passenger 90 (a positive direction), the support shaft part 13 (i.e., the display unit 14) is tilted in the direction opposite to the swing by the same angle as the absolute value of the inclination degree θ11 of the hanging band part. In this way, in the present example, the display unit 14 is rotated by 27 degrees in a negative direction, and therefore the display unit 14 gets still in the substantially vertically downward direction.

As another method, the display unit 14 may be tilted in the opposite direction by the absolute value of the inclination degree θ11, for example. In a case where the hanging band part 11 swings in the direction of approaching the passenger 90, the support shaft part 13 may be rotated in the direction opposite to the direction of the swing. In this way, the display unit 14 can be made still in a state in which the display unit 14 slightly inclines in the downward direction. The hanging strap 10 is installed at a slightly higher position than the position of the eyes 91 of the passenger 90 in many cases, and thus the passenger 90 visually recognizes the image on the information display surface 14a of the display unit 14 easily.

By providing the determination (step S12) using the threshold value Th, it is possible not to perform the tilt of the display unit 14 for a slight inclination. This can avoid a situation in which the display unit 14 is frequently rotated slightly before the eyes and it becomes difficult for the passenger 90 to visually recognize information on the display unit 14 in a state where the passenger 90 gazes the display unit 14.

Figure 9:
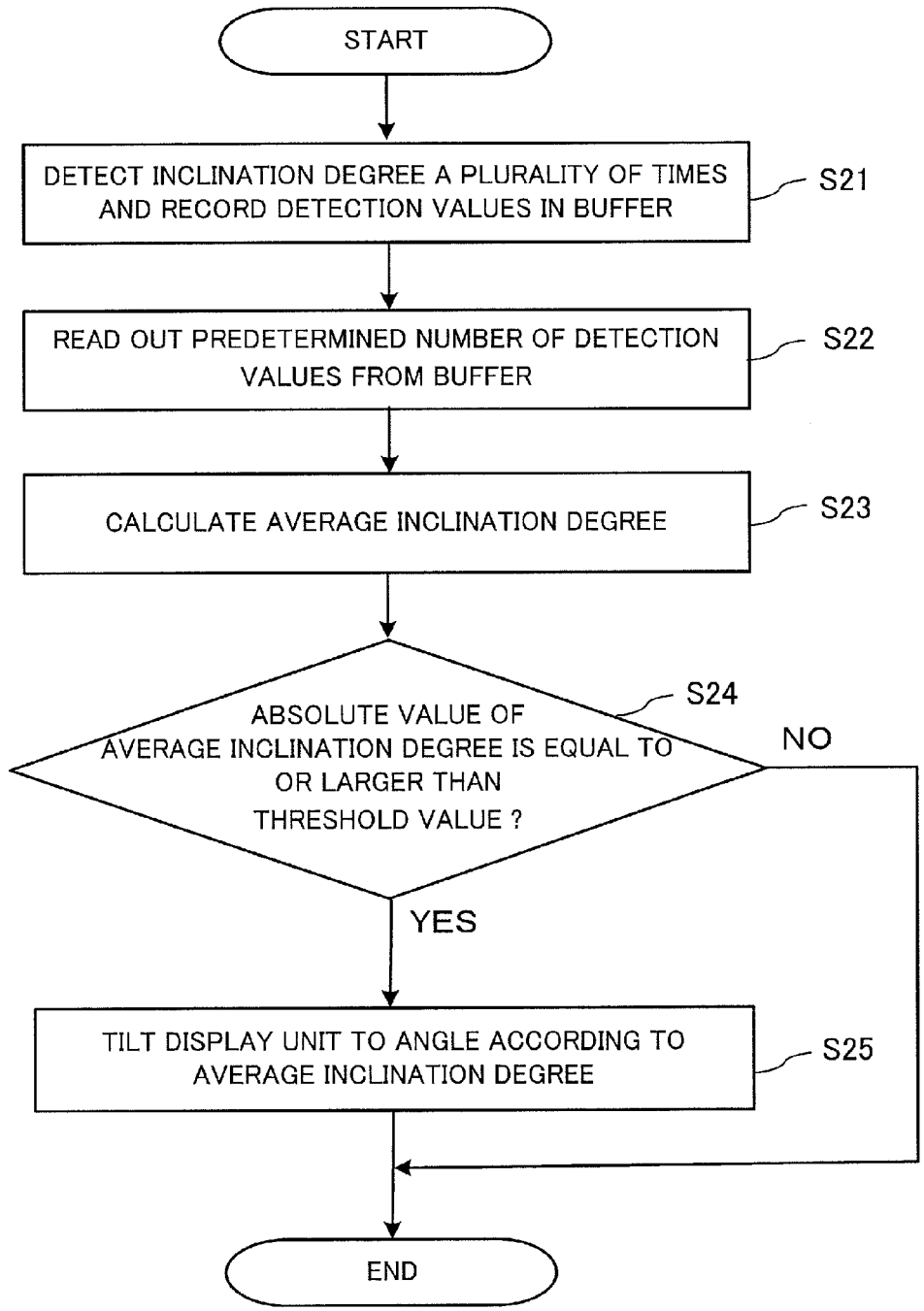
FIG. 9 is a flowchart schematically illustrating another example of operation of the tilt control processing unit of the hanging-strap information display device according to the first embodiment.

FIG. 9 is a flowchart schematically illustrating another example of operation of the tilt control processing unit 30 of the hanging-strap information display device 1 according to the first embodiment. In the example illustrated in FIG. 9, the inclination degree sensor 31 detects the inclination degree θ11 of the hanging band part 11 of the hanging strap 10 a plurality of times, and records a plurality of detection values in the buffer 33 (step S21). Thereafter, the inclination degree recognition unit 32 reads out a predetermined number of detection values from the buffer 33 (step S22), and calculates an average inclination degree of them (step S23). Thereafter, the inclination degree recognition unit 32 determines whether or not the absolute value of the average inclination degree is equal to or larger than a predetermined threshold value (step S24). If the determination in step S24 is YES, the tilt control unit 34 sends to the tilt drive unit 20 an instruction signal to tilt the display unit 14 to an angle according to the average inclination degree (step S25). If the determination in step S24 is NO, the tilt control unit 34 does not send the instruction signal to the tilt drive unit 20, and ends the process. In this way, calculating the average inclination degree can avoid a situation in which rotation of the display unit 14 is performed unnecessarily in a case where the vehicle largely inclines only momentarily and thereafter returns to an original inclination promptly, for example.

Figure 10:
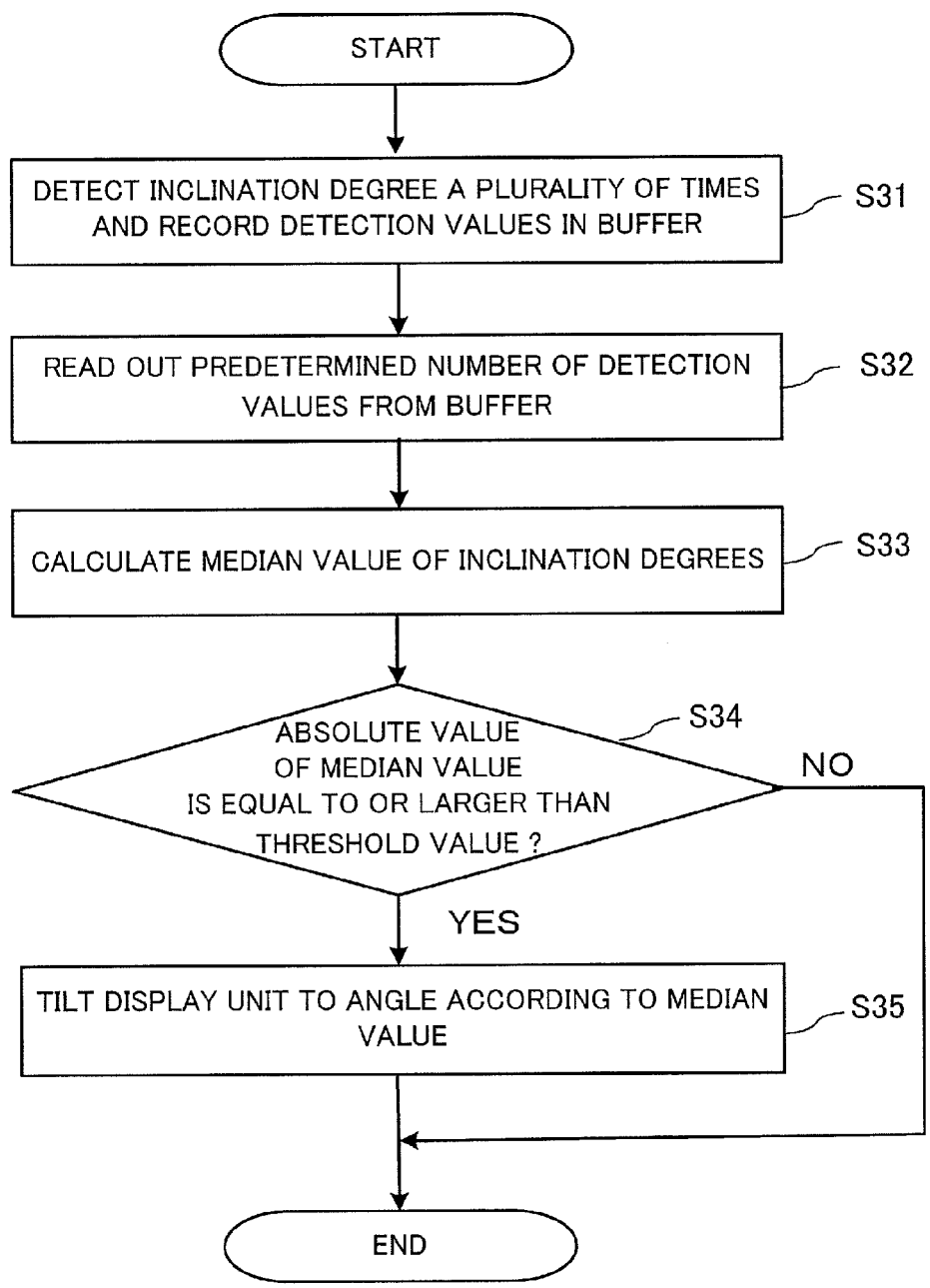
FIG. 10 is a flowchart schematically illustrating yet another example of operation of the tilt control processing unit of the hanging-strap information display device according to the first embodiment.

FIG. 10 is a flowchart schematically illustrating yet another example of operation of the tilt control processing unit 30 of the hanging-strap information display device 1 according to the first embodiment. In the example illustrated in FIG. 10, the inclination degree sensor 31 detects the inclination degree θ11 of the hanging band part 11 of the hanging strap 10 a plurality of times, and records a plurality of detection values in the buffer 33 (step S31). Thereafter, the inclination degree recognition unit 32 reads out a predetermined number of detection values from the buffer 33 (step S32), and calculates a median value of them (step S33). Thereafter, the inclination degree recognition unit 32 determines whether or not the absolute value of the median value is equal to or larger than a predetermined threshold value (step S34). If the determination in step S34 is YES, the tilt control unit 34 sends to the tilt drive unit 20 an instruction signal to tilt the display unit 14 to an angle according to the median value (step S35). If the determination in step S34 is NO, the tilt control unit 34 does not send the instruction signal to the tilt drive unit 20, and ends the process. In this way, calculating the median value can avoid a situation in which rotation of the display unit 14 is performed unnecessarily in a case where the vehicle largely inclines only momentarily and thereafter returns to an original inclination promptly, for example.

FIG. 11(a) is a side view illustrating a case in which an angle θ14 of the tilt of the display unit 14 is 0 degrees in a state in which a hanging-strap information display device of a comparative example swings and inclines in the direction away from the passenger 90 (inclination degree θ11), and FIG. 11(b) is a side view illustrating the angle θ14 of the tilt of the display unit 14 in a state in which the hanging-strap information display device 1 according to the first embodiment swings and inclines in the direction away from the passenger 90 (inclination degree θ11). As can be understood from the examples of FIGS. 11(a) and 11(b), in the comparative example of FIG. 11(a), even in a state in which the hanging-strap information display device swings and inclines in the direction away from the passenger 90 (inclination degree θ11), the angle θ14 of the tilt of the display unit 14 is 0 degrees, and thus the information display surface 14a of the display unit 14 is directed obliquely downward, and the eyes 91 of the passenger 90 view the information display surface 14a not from the front but obliquely. In contrast, in the case of the first embodiment of FIG. 11(b), even in a state in which the hanging-strap information display device 1 swings and inclines in the direction away from the passenger 90 (inclination degree θ11), the angle θ14 of the tilt of the display unit 14 can direct the information display surface 14a to the vicinity of the front of the eyes 91 of the passenger 90. Hence, according to the first embodiment, when the hanging band part 11 of the hanging strap swings and inclines in the direction away from the passenger 90 that squarely faces the information display surface 14a of the display unit 14, the display unit 14 tilts according to the inclination degree of the hanging band part 11, and therefore, even if the passenger 90 does not move his face, a direction of the information display surface 14a of the display unit 14 can be set at an angle at which it is easy for the passenger 90 to perform visual recognition.

Figures 12A, 12B:
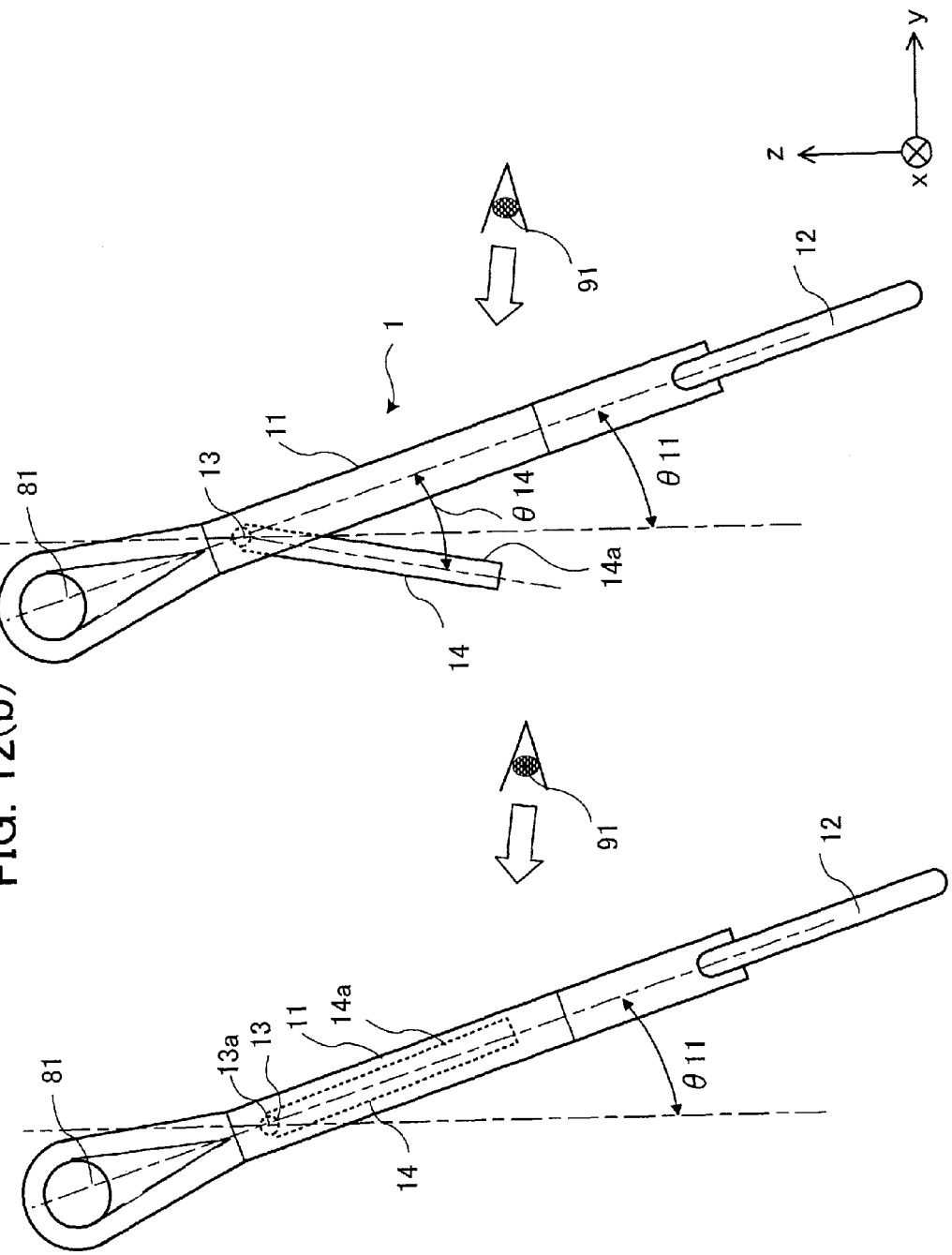
FIGS. 12(a) and 12(b) are side views illustrating an angle of the tilt of the display unit in a state in which the hanging-strap information display device according to the first embodiment swings and inclines in the direction of approaching the passenger.

FIG. 12(a) is a side view illustrating a case in which the angle θ14 of the tilt of the display unit 14 is 0 degrees in a state in which the hanging-strap information display device of the comparative example swings and inclines in the direction of approaching the passenger 90 (inclination degree θ11), and FIG. 12(b) is a side view illustrating the angle θ14 of the tilt of the display unit 14 in a state in which the hanging-strap information display device 1 according to the first embodiment swings and inclines in the direction of approaching the passenger 90 (inclination degree θ11). As can be understood from the examples of FIGS. 12(a) and 12(b), in the comparative example of FIG. 12(a), even in a state in which the hanging-strap information display device 1 swings and inclines in the direction of approaching the passenger 90 (inclination degree θ11), the angle θ14 of the tilt of the display unit 14 is 0 degrees, and thus the information display surface 14a of the display unit 14 is directed obliquely upward, and the eyes 91 of the passenger 90 view the information display surface 14a not from the front but obliquely. In contrast, in the case of the first embodiment of FIG. 12(b), even in a state in which the hanging-strap information display device 1 swings and inclines in the direction of approaching the passenger 90 (inclination degree θ11), the angle θ14 of the tilt of the display unit 14 is not 0 degrees, and the information display surface 14a of the display unit 14 is directed to substantially the front of the eyes 91 of the passenger 90. Hence, according to the first embodiment, when the hanging band part 11 of the hanging strap swings and inclines in the direction of approaching the passenger 90 that squarely faces the information display surface 14a of the display unit 14, the display unit 14 tilts according to the inclination degree θ11 of the hanging band part 11, and therefore, even if the passenger 90 does not move his face, the direction of the information display surface 14a of the display unit 14 can be set at an angle at which it is easy for the passenger 90 to perform visual recognition.

Figure 13:
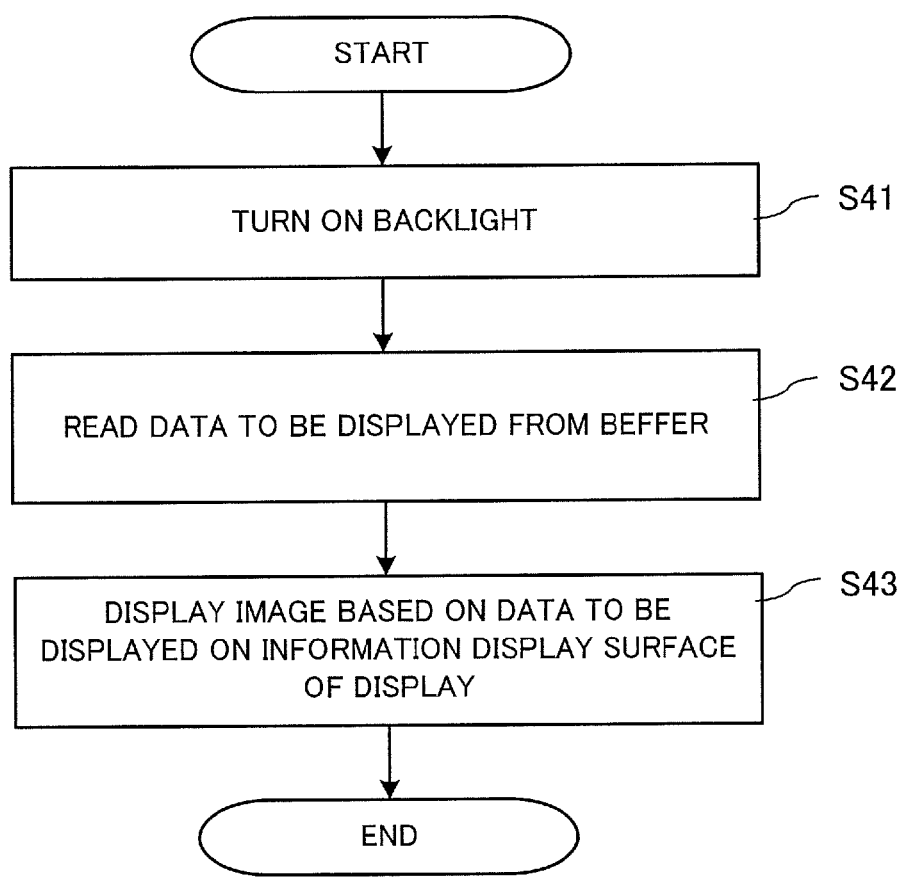
FIG. 13 is a flowchart schematically illustrating an example of operation of a display control processing unit of the hanging-strap information display device according to the first embodiment.

FIG. 13 is a flowchart schematically illustrating an example of operation of the display control processing unit 40 of the hanging-strap information display device 1 according to the first embodiment. First, a backlight drive unit 44 sends to the information display unit 14a a control signal to turn on the backlight of the information display unit 14a, to turn on the backlight (step S41). A display control unit 41 receives the control signal from the backlight drive unit 44, reads data to be displayed on the display unit 14 from a buffer 42, and supplies the read data to a display drive unit 43 (step S42). The display drive unit 43 displays an image based on the data received from the display control unit 41, on the information display unit 14a (step S43).

As described above, in the hanging-strap information display device 1 according to the first embodiment, even in a case where the hanging strap 10 inclines in the depth direction by how the passenger 90 grips the hanging strap 10 or how the vehicle inclines, it is possible to control the angle of the display unit 14, so that it is easy for the squarely facing passenger 90 to visually recognize information displayed on the information display surface 14a of the display unit 14.

Moreover, in the above explanation, improvement of visibility of the passenger 90 that squarely faces the hanging strap 10 and grips the hold part 12 of the hanging strap 10 has been described, but the present invention is also applicable to a case in which the information display surface 14a is provided on both surfaces of the display unit 14. In this case, it is possible to display images that are easy to be visually recognized for passengers 90 that squarely face both of the information display surface of the display unit 14.

Moreover, in the above explanation, control of the backlight has been described as an information display process, but the present invention can also be applied to the display unit 14 which does not have the backlight. In this case, it is unnecessary for the display control processing unit 40 to include the backlight drive unit 44.

Second Embodiment

Figure 14:
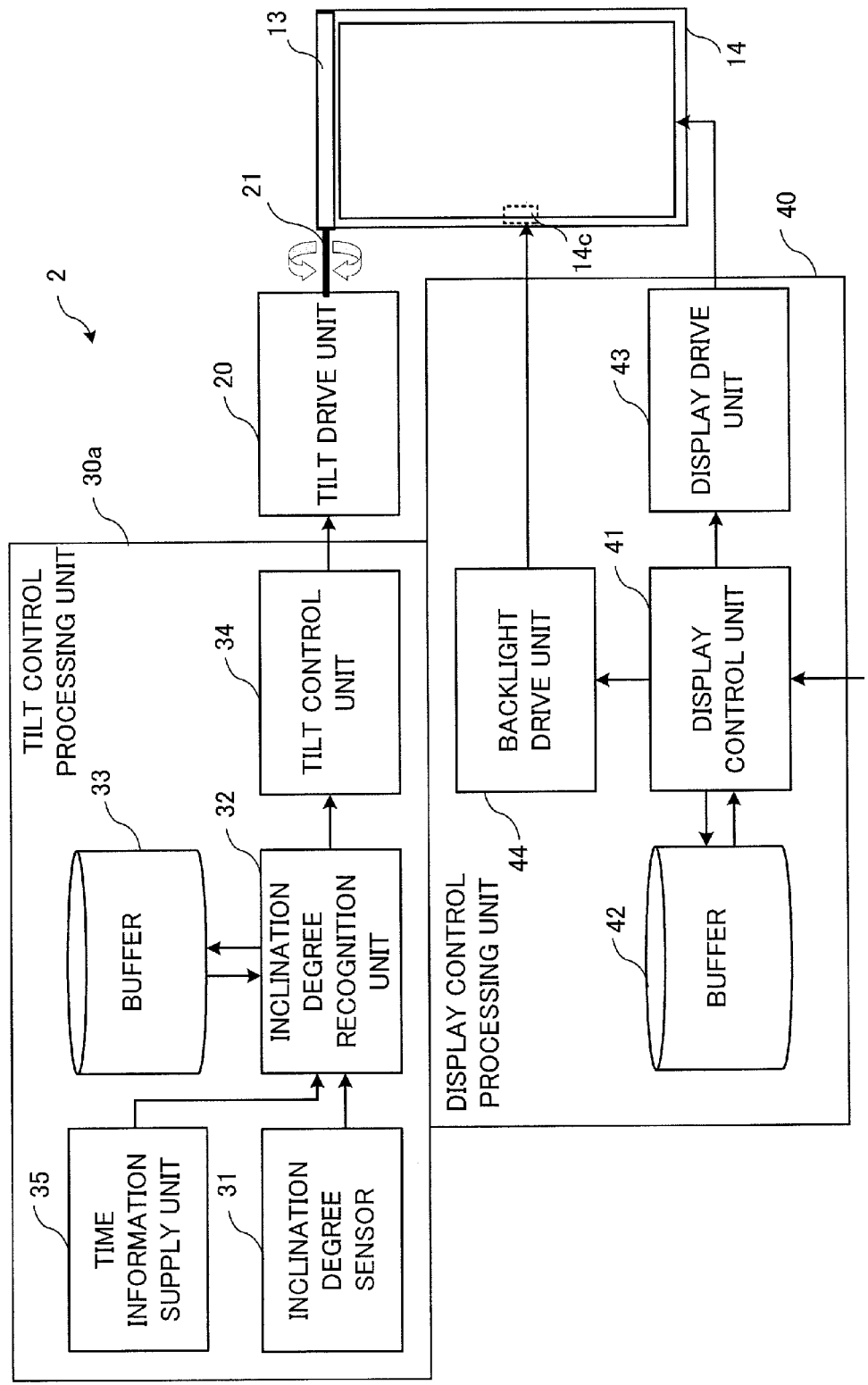
FIG. 14 is a block diagram schematically illustrating a configuration of a hanging-strap information display device according to a second embodiment of the present invention.

FIG. 14 is a block diagram schematically illustrating a configuration of a hanging-strap information display device 2 according to a second embodiment of the present invention. In FIG. 14, components that are the same as or corresponding to the components shown in FIG. 6 (the first embodiment) are assigned the same reference characters as the reference characters shown in FIG. 6. The hanging-strap information display device 2 according to the second embodiment is different from the hanging-strap information display device 1 according to the first embodiment, in that a tilt control processing unit 30a includes a time information supply unit 35 including a clock or the like, in that an inclination degree detected by the inclination degree sensor 31 and its detection time (received from the time information supply unit 35) are temporarily saved in the buffer 33, and in that the inclination degree recognition unit 32 calculates an average inclination degree of inclination degrees within a predetermined time and supplies it to the tilt control unit 34. With regard to other points, the second embodiment is substantially the same as the first embodiment.

Figure 15:
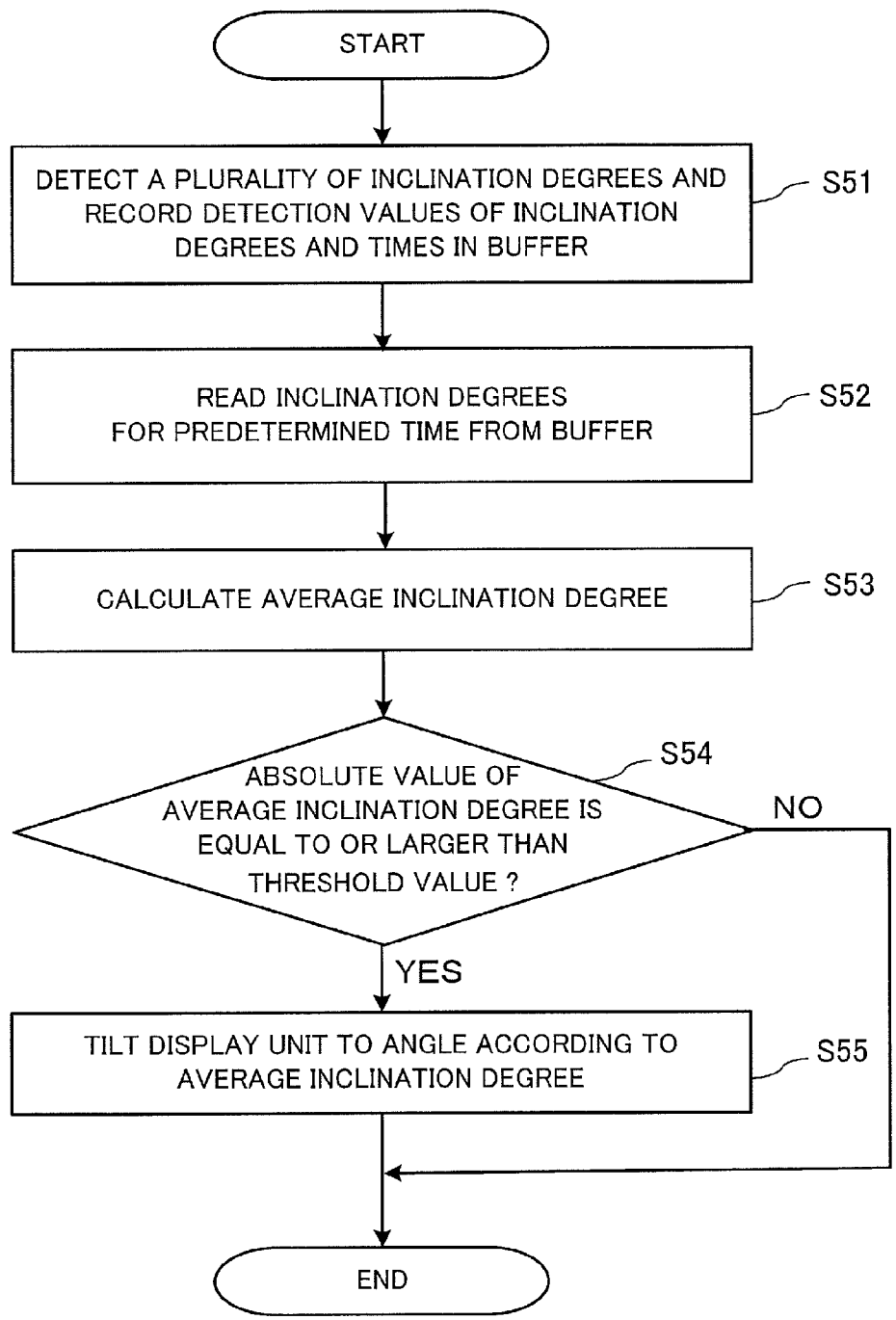
FIG. 15 is a flowchart schematically illustrating an example of operation of a tilt control processing unit of the hanging-strap information display device according to the second embodiment.

FIG. 15 is a flowchart schematically illustrating an example of operation of the tilt control processing unit 30*a* of the hanging-strap information display device 2 according to the second embodiment. Moreover, FIG. 16 is a diagram illustrating an example of data that is temporarily stored in the buffer 33 of the tilt control processing unit 30*a* of the hanging-strap information display device 2 according to the second embodiment. In the second embodiment, first, the inclination degree sensor 31 detects the inclination degree θ11 (within the range from −90 degrees to +90 degrees) in the depth direction of the hanging strap 10, and the inclination degree recognition unit 32 performs, a plurality of times, processing of recording the inclination degree θ11 detected by the inclination degree sensor 31 and the time at which the inclination degree θ11 is received, in the buffer 33 (step S51). In the example of FIG. 16, recording is performed in a text file form, and times 33*a* at which inclination degrees are detected and inclination degrees 33*b* of the hanging strap at those times are recorded in the buffer 33.

Thereafter, the inclination degree recognition unit 32 reads the inclination degrees at predetermined time intervals for the predetermined time from the buffer 33. For example, if the detection times of the inclination degrees "+10 degrees, +23 degrees, +28 degrees, . . . , +33 degrees" of the 10 times detections from 0.0 to 0.9 among the inclination degrees recorded in the buffer 33 are within the predetermined time as in FIG. 16, the detections of these 10 times are read (step S52).

Thereafter, the inclination degree recognition unit 32 calculates the average inclination degree of the read inclination degrees for the predetermined time, and supplies the value of the average inclination degree to the tilt control unit 34. For example, in a case where an average inclination degree of the times "0.0" to "0.9" among the inclination degrees recorded in the buffer 33 is calculated as in FIG. 16, "+27 degrees" is calculated as the average inclination degree and is supplied to the tilt control unit 34 (step S53).

Thereafter, the tilt control unit 34 determines whether or not the absolute value of the average inclination degree calculated and received in step S53 is equal to or larger than a predetermined threshold value Th. The threshold value Th can be set at an arbitrary value (step S54).

If the determination is YES in step S54, the tilt control unit 34 sends a control signal to the tilt drive unit 20, and rotates the support shaft part 13 by an angle according to the average inclination degree (step S55). For example, if +27 degrees is calculated as the average inclination degree and the threshold value Th is 10 degrees, the absolute value of the average inclination degree is equal to or larger than the threshold value Th, and thus the support shaft part 13 is rotated by the angle according to +27 degrees. As a simple method, with respect to the average inclination degree which is in the direction of approaching the passenger 90 (a positive direction), the support shaft part 13 is tilted (rotated) in the negative direction by the same angle as the inclination degree. In this way, the display unit 14 is rotated by 27 degrees in the negative direction, and therefore the display unit 14 gets still in a substantially vertical direction.

In another method, rotation in the direction opposite to a swing direction of the hanging strap 10 by "(the absolute value of the average inclination degree)−(a predetermined angle)", for example "(the absolute value of the average inclination degree)−20 degrees" may be performed (the display unit 14 may be tilted in the negative direction if the average inclination degree is in the positive direction, and the display unit 14 may be tilted in the positive direction if the average inclination degree is in the negative direction). In this way, the information display surface 14*a* of the display unit 14 can be made still in a state in which it is inclining slightly downward, as illustrated in FIGS. 11(*b*) and 12(*b*). The hanging strap 10 is installed at a slightly higher position than the eyes of the passenger 90 in many cases, and thus in this way it becomes easier for the passenger 90 to visually recognize the display unit 14.

If the determination is NO in step S54, the tilt control unit 34 does not send a control signal to the tilt drive unit 20, and the support shaft part 13 does not rotate. In this way, by providing the threshold value Th, it is possible not to perform rotation of the display unit 14 for a slight inclination. This can avoid a situation in which the display unit 14 is frequently rotated slightly before the eyes and thereby it becomes difficult for the passenger 90 to visually recognize information on the display unit 14 in a state where the passenger 90 gazes the display unit 14. Moreover, in this way, by calculating the average inclination degree for the predetermined time, it is possible not to perform rotation of the display unit 14 unnecessarily in a case where the vehicle largely inclines only momentarily and thereafter returns to the original inclination promptly, for example.

Moreover, in the second embodiment, it has been described that the inclination degree recognition unit 32 calculates an average of inclination degrees for a predetermined time and tilts the display unit 14 according to the average inclination degree, but a median value of a plurality of detected inclination degrees for a predetermined time may be calculated and supplied to the tilt control unit 34. For example, as in FIG. 16, the median value (the 5th largest inclination degree) with regard to the inclination degrees "+10 degrees, +23 degrees, +28 degrees, . . . , +33 degrees" of the detection of 9 times from "0.0" to "0.8" among the inclination degrees recorded in the buffer 33 is "+28 degrees". In this way, it is possible to prevent receiving strong influence by a momentarily generated inclination. For example, in a case where the inclination degree detected at the time "0.2" is "−83 degrees" in FIG. 16, the average inclination degree of "+10 degrees, +23 degrees, −83 degrees, . . . , +33 degrees" of the 9 times detections from "0.0" to "0.8" is "+14 degrees", and strong influence is received by a momentarily generated inclination. Incidentally, in a case where a median value of inclination degrees of an even number of times is obtained, the median value is set at an inclination degree calculated by a method such as "(a predetermined number of times divided by 2)-th largest inclination degree", "((a predetermined number of times divided by 2)+1)-th largest inclination degree", or "an average of (a predetermined number of times divided by 2)-th largest inclination degree and ((a predetermined number of times divided by 2)+1)-th largest inclination degree".

As described above, in the hanging-strap information display device 2 according to the second embodiment, even in a case where the hanging strap 10 inclines in the depth direction by how the passenger 90 grips the hanging strap 10 or how the vehicle inclines, it is possible to control the angle of the display unit 14, so that it is easy for the passenger 90 that squarely faces the information display surface 14*a* of the display unit 14 to visually recognize the information displayed on the information display surface 14*a* of the display unit 14.

Moreover, in the above explanation, improvement of visibility of the passenger 90 that squarely faces the hanging strap 10 and grips the hold part 12 of the hanging strap 10 has been described, but the present invention is also applicable to a case in which the information display surface 14a is provided on both surfaces of the display unit 14. In this case, it is possible to display images that are easy to be visually recognized for passengers 90 that squarely face both of the information display surface of the display unit 14.

Third Embodiment

Figure 17:
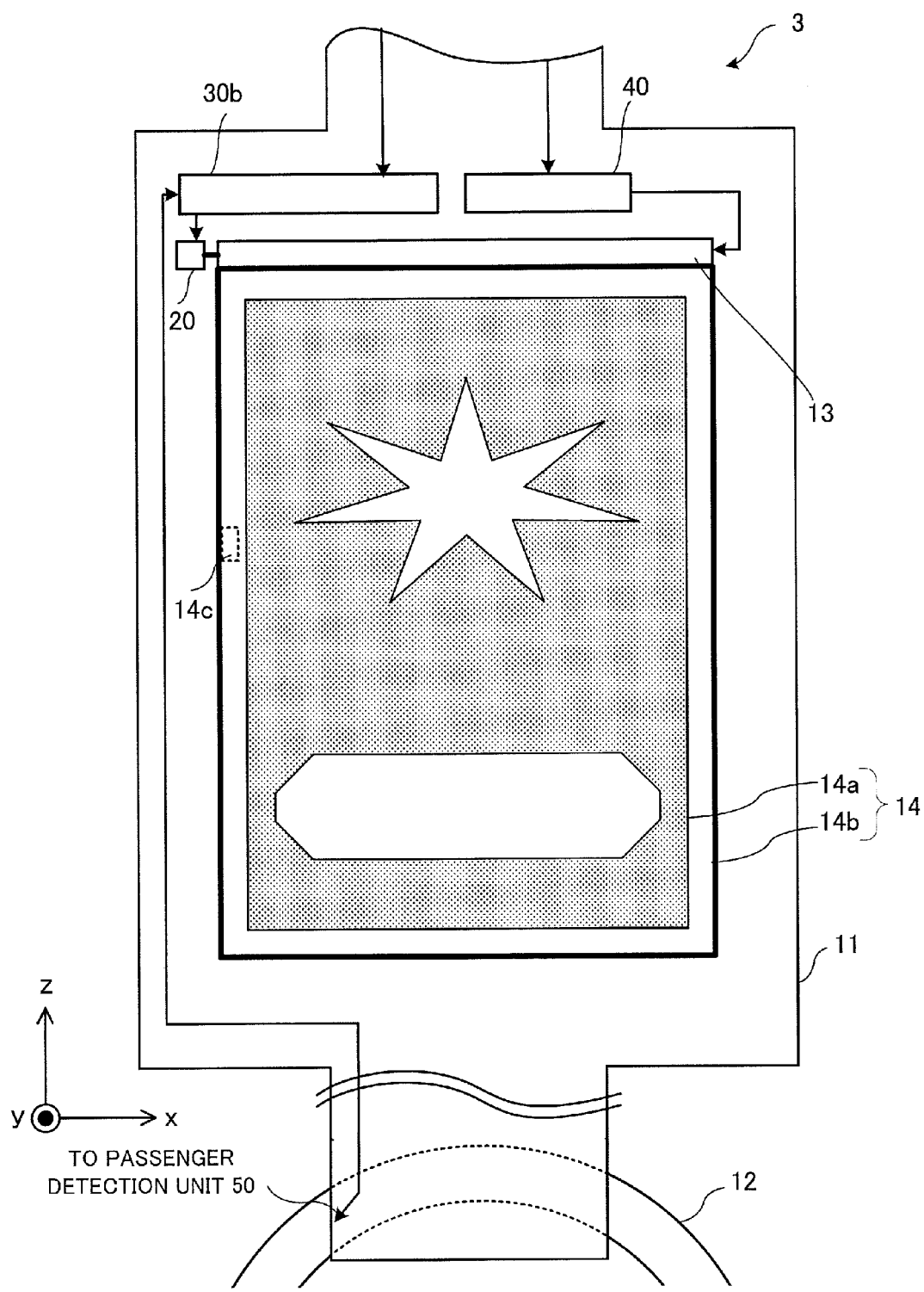
FIG. 17 is a main part front view schematically illustrating a configuration of a hanging-strap information display device according to a third embodiment of the present invention.
Figure 18:
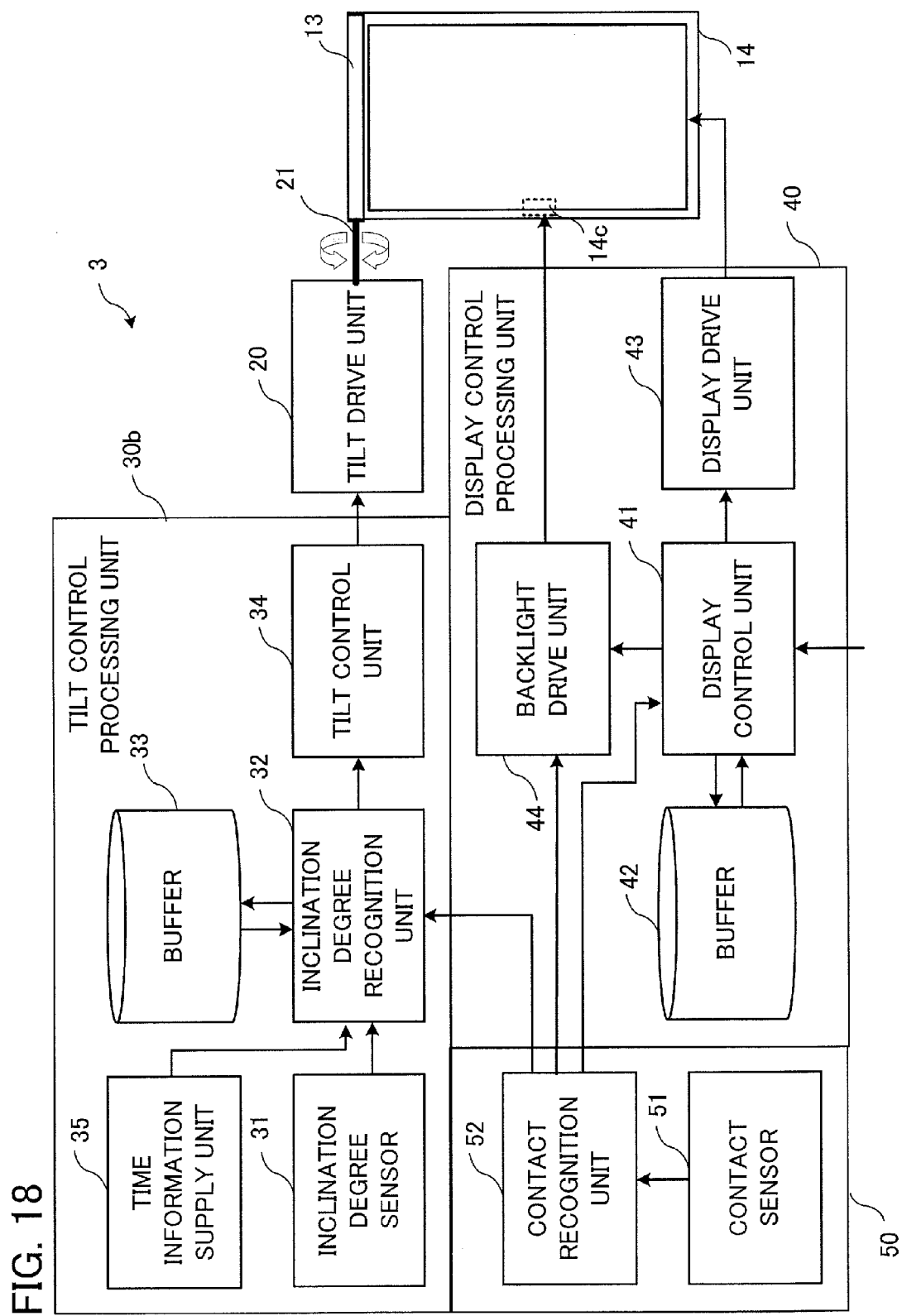
FIG. 18 is a block diagram schematically illustrating a configuration of the hanging-strap information display device according to the third embodiment.

FIG. 17 is a main part front view schematically illustrating a configuration of a hanging-strap information display device 3 according to a third embodiment of the present invention. In FIG. 17, components that are the same as or corresponding to the components shown in FIG. 5 (the first embodiment) are assigned the same reference signs as the reference signs shown in FIG. 5. FIG. 18 is a block diagram schematically illustrating the configuration of the hanging-strap information display device 3 according to the third embodiment. In FIG. 18, components that are the same as or corresponding to the components shown in FIG. 6 (the first embodiment) and FIG. 13 (the second embodiment) are assigned the same reference signs as the reference signs shown in FIG. 6 and FIG. 13. The hanging-strap information display device 3 according to the third embodiment further includes a passenger detection unit 50 that detects presence or absence of the passenger 90 that squarely faces the information display surface 14a of the display unit 14 and supplies a notification signal indicating a result of the detection to the tilt control unit 34 of the tilt control processing unit 30b, and the tilt control unit 34 is different from that of the first and second embodiments in causing the tilt drive unit 20 to stop the tilt of the display unit 14 when receiving the notification signal of absence of the passenger. With regard to other points, the third embodiment is substantially the same as the first or second embodiment.

As illustrated in FIG. 18, the passenger detection unit 50 is characterized in including a contact sensor 51 that detects whether or not the passenger 90 touches the hold part 12 of the hanging strap 10, and a contact recognition unit 52. For example, the contact sensor 51 is an electrostatic sensor that is disposed on a part or all of the surface of the hold part 12 and detects contact of the passenger 90 by detecting a change of electrostatic capacitance.

The contact sensor 51 detects whether or not the passenger 90 touches the hold part 12 of the hanging-strap information display device 3, and supplies the information to the contact recognition unit 52. The contact recognition unit 52 receives a signal indicating whether or not the passenger 90 touches the hold part 12 from the contact sensor 51, and supplies a signal indicating whether or not the hold part 12 is gripped, to the inclination degree recognition unit 32. The inclination degree recognition unit 32 receives the signal indicating whether or not the hold part 12 is gripped from the contact recognition unit 52, and supplies an inclination degree in the depth direction with respect to the passenger that squarely faces the hanging-strap information display device 3, to the tilt control unit 34 or the buffer 33 through the inclination degree recognition unit 32, while the hold part 12 is gripped.

Figure 19:
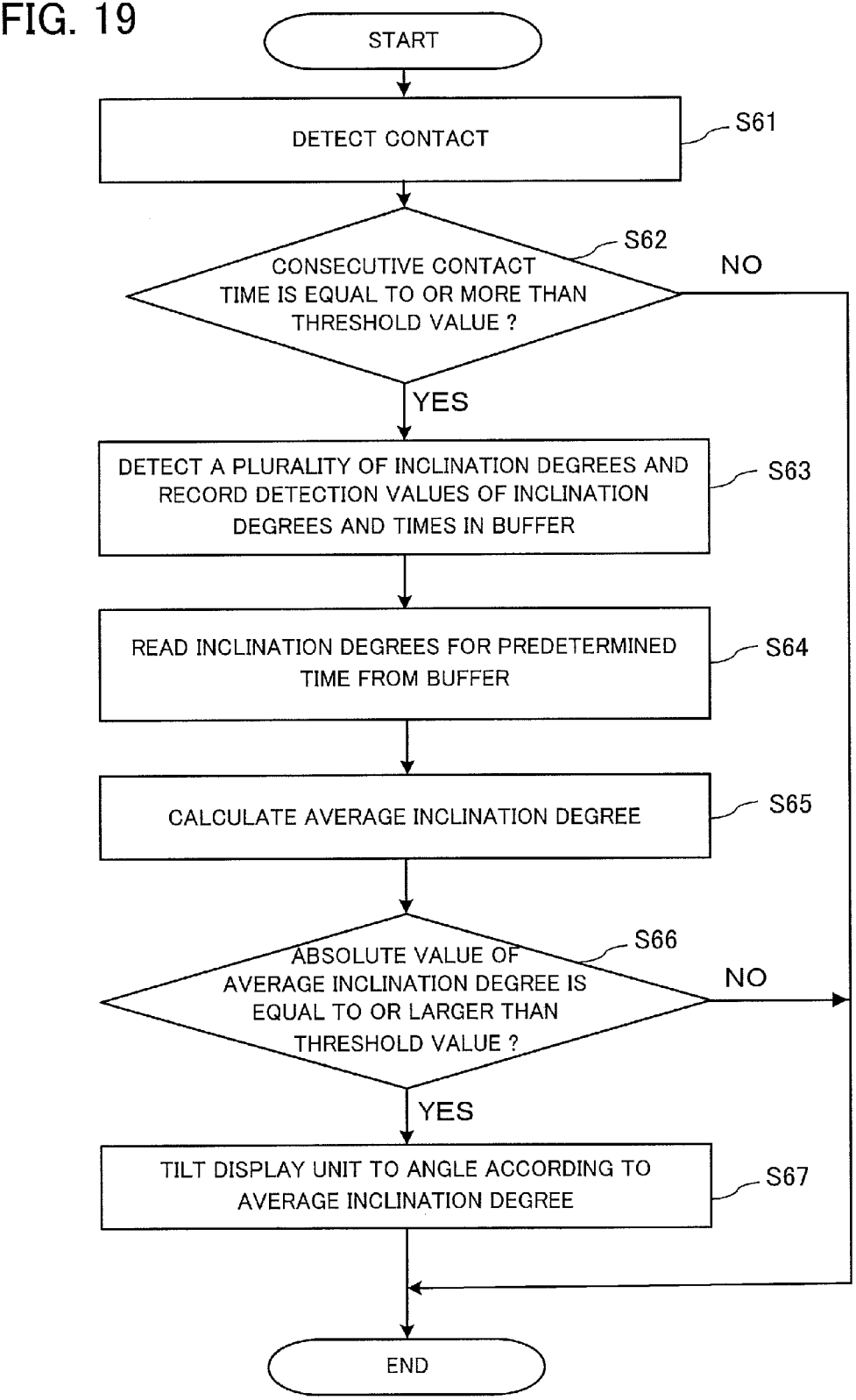
FIG. 19 is a flowchart schematically illustrating an example of operation of a tilt control processing unit of the hanging-strap information display device according to the third embodiment.

FIG. 19 is a flowchart illustrating a tilt control process of the hanging-strap information display device 3 according to the third embodiment. The contact sensor 51 detects whether or not the passenger 90 touches the hold part 12 of the hanging-strap information display device 3, at predetermined time intervals, and supplies results of the detection to the contact recognition unit 52 (step S61). The contact recognition unit 52 receives the contact detection results from the contact sensor 51, which indicates whether or not it is contacted, and determines whether or not contact detection results that are received at predetermined time intervals indicate that it is contacted consecutively a certain number of times or more (step S62). If it is contacted consecutively a certain predetermined number of times or more (YES in step S62), the contact recognition unit 52 recognizes that the passenger 90 is gripping the hanging-strap information display device 3. In this case, the contact recognition unit 52 supplies a signal indicating that the hanging-strap information display device 3 is gripped to the inclination degree sensor 31, and the inclination degree sensor 31 that has received it starts to detect the inclination degree (step S63).

If the contact sensor 51 is not contacted consecutively the certain predetermined number of times or more (NO in step S62), the contact recognition unit 52 recognizes that the passenger 90 is not gripping the hanging-strap information display device 3. In this case, the contact recognition unit 52 sends a signal indicating that the hanging-strap information display device 3 is not gripped to the inclination degree sensor 31, and the inclination degree sensor 31 that have received it does not detect the inclination degree. The predetermined number of times can be set arbitrarily, and if it is extremely small, it is recognized that the passenger 90 is gripping even if he contacts only momentarily. Steps S63 to S67 are the same as the operation of steps S51 to S55 in FIG. 15 which has been described in the second embodiment.

Moreover, the contact sensor 51 detects whether or not the passenger 90 touches the hold part 12 of the hanging-strap information display device 3, and supplies the information to the contact recognition unit 52. The contact recognition unit 52 receives a signal indicating whether or not the passenger 90 touches the hold part 12 from the contact sensor 51, and supplies a signal indicating whether or not the hanging-strap information display device 3 is gripped to the backlight drive unit 44. The backlight drive unit 44 receives the signal indicating whether or not the hanging-strap information display device 3 is gripped from the contact recognition unit 52, and sends a control signal to instruct turning on or turning off the backlight of the information display unit 14a to the information display unit 14a. Alternatively, a control signal to disconnect a power supply of the information display unit 14a is sent to the information display unit 14a. Moreover, a control signal to instruct readout of the data to be displayed on the display unit 14 is sent to the display control unit 41.

Figure 20:
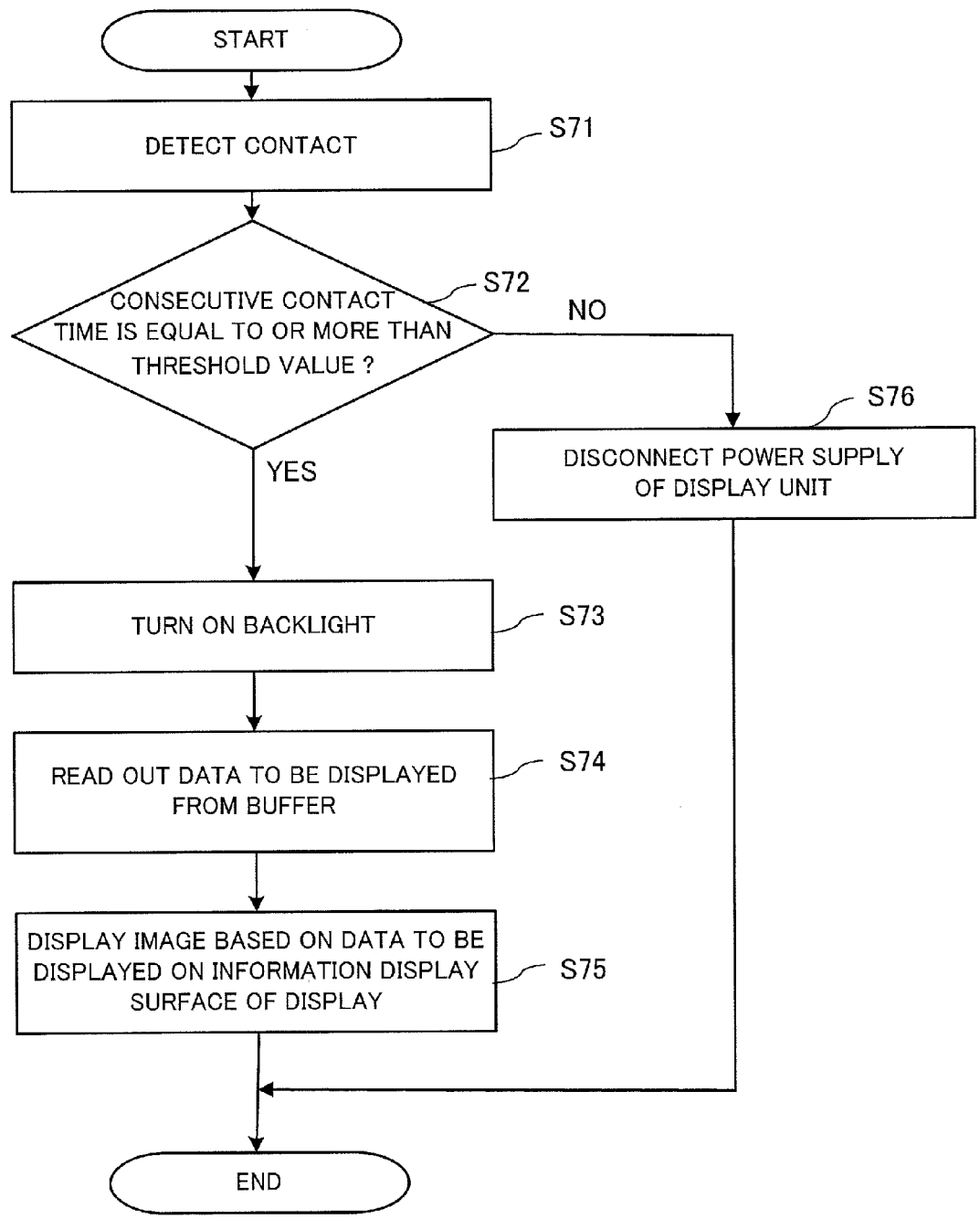
FIG. 20 is a flowchart schematically illustrating an example of operation of a display control processing unit of the hanging-strap information display device according to the third embodiment.

FIG. 20 is a flowchart illustrating an information display process of the hanging-strap information display device 3 according to the third embodiment. The contact sensor 51 detects whether or not the passenger 90 touches the hold part 12 of the hanging-strap information display device 3 at predetermined time intervals, and supplies results of the detection to the contact recognition unit 52 (step S71). The contact recognition unit 52 receives the contact detection results from the contact sensor 51, that indicates whether or not it is contacted, and determines whether or not contact detection results that are received at predetermined time intervals indicate that it is contacted consecutively a certain number of times or more (step S72).

If it is contacted consecutively the certain predetermined number of times or more (YES in step S72), the contact recognition unit 52 recognizes that the passenger 90 is gripping the hanging-strap information display device 3. In this case, the contact recognition unit 52 sends a signal indicating that the hanging-strap information display device 3 is gripped to the backlight drive unit 44, and the backlight drive unit 44 that has received it sends a control signal to turn on the backlight of the information display unit 14a to the information display unit 14a, to turn on the backlight. However, nothing is performed in a case where the backlight is already in a turned on state (step S73).

Further, the backlight drive unit 44 sends to the display control unit 41 a signal to instruct read of data to be displayed on the information display surface 14a of the display unit 14 from the buffer 42, and the display control unit 41 which has received the signal, reads the data, and supplies it to the display drive unit 43 (step S74). Thereafter, the display drive unit 43 displays an image based on the data received from the display control unit 41 on the information display unit 14a (step S75).

On the other hand, if the contact sensor 51 is not contacted consecutively the certain predetermined number of times or more (NO in step S72), it is recognized that the passenger 90 is not gripping the hanging-strap information display device 3. In this case, a signal indicating that the hanging-strap information display device 3 is not gripped is sent to the backlight drive unit 44, and the backlight drive unit 44 sends a control signal to disconnect the power supply of the information display unit 14a to the information display unit 14a, to disconnect the power supply of the information display unit 14a (for example, turn off the backlight). However, nothing is performed, in a case where the power supply of the information display unit 14a is already in a disconnected state (step S76).

As described above, in the hanging-strap information display device 3 according to the third embodiment, it can be recognized whether or not the hold part 12 of the hanging strap 10 is gripped by the passenger 90, and the tilt control process or the information display process can be performed only in a case where the hold part 12 is gripped. Thereby, electric power consumption can be reduced in the hanging-strap information display device 3 in which the passenger 90 is not gripping the hold part 12 of the hanging strap 10.

Fourth Embodiment

Figure 21:
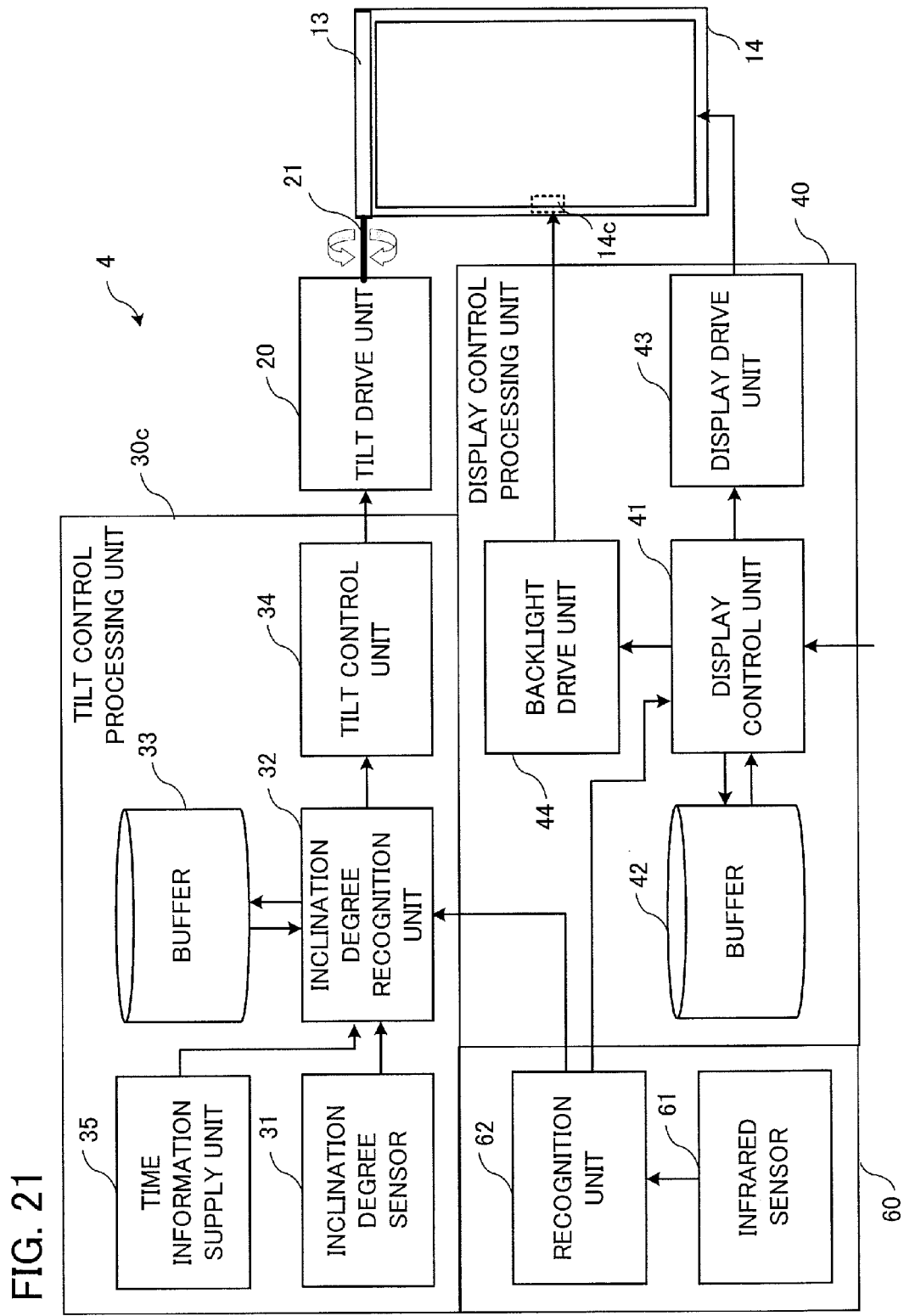
FIG. 21 is a block diagram schematically illustrating a configuration of a hanging-strap information display device according to a fourth embodiment of the present invention.

FIG. 21 is a block diagram schematically illustrating a configuration of a hanging-strap information display device 4 according to a fourth embodiment of the present invention. In FIG. 21, components that are the same as or corresponding to the components shown in FIG. 6 (the first embodiment) and FIG. 18 (the third embodiment) are assigned the same reference characters as the reference characters shown in FIG. 6 and FIG. 18. The hanging-strap information display device 4 according to the fourth embodiment is different from the third embodiment in that the passenger detection unit 60 includes an infrared sensor 61 as a human detection sensor and a recognition unit 62, and in that a tilt control processing unit 30c controls the operation of the tilt drive unit 20 by using a detection signal of the passenger detection unit 60. With regard to other points, the fourth embodiment is the same as the third embodiment.

Fifth Embodiment

Figure 22:
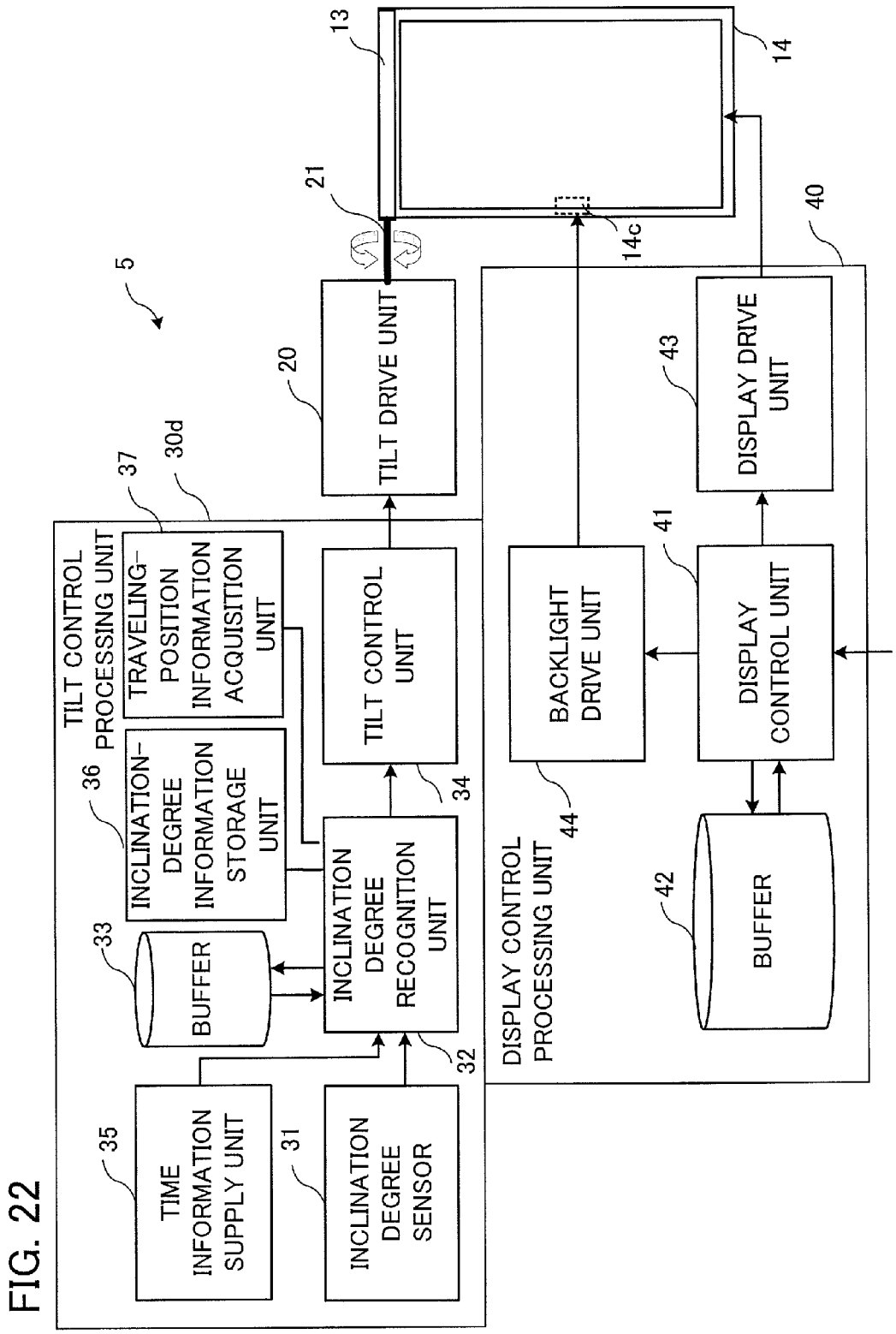
FIG. 22 is a block diagram schematically illustrating a configuration of a hanging-strap information display device according to a fifth embodiment of the present invention.

FIG. 22 is a block diagram schematically illustrating a configuration of a hanging-strap information display device 5 according to a fifth embodiment of the present invention. In FIG. 22, components that are the same as or corresponding to the components shown in FIG. 6 (the first embodiment) are assigned the same reference characters as the reference characters shown in FIG. 6. In the first embodiment, the tilt of the display unit 14 is controlled according to the inclination degree $\theta 11$ of the hanging strap 10 detected by the inclination degree sensor 31, but in the fifth embodiment, an inclination of the vehicle 80 is predicted in advance in association with a traveling position, and the display unit 14 is tilted on the basis of the predicted inclination.

For example, in the vehicle 80 of an electric train as the movable body, the inclination of the vehicle 80 generated at each spot at which it travels can be predicted to a certain degree. A tilt control processing unit 30d of the hanging-strap information display device 4 is newly provided with an inclination-degree information storage unit 36 for storing such advance prediction information as inclination information and a traveling-position information acquisition unit 37 that acquires information indicating which spot the vehicle is traveling at from the inside or the outside of the vehicle. Thereby, the traveling spot acquired from the traveling-position information acquisition unit 37 is checked sequentially against the prediction information stored in the inclination-degree information storage unit 36 and the display unit 14 is tilted according to the result, so that the direction of the information display surface 14a of the display unit 14 can be directed to a position that is assumed to be the position of the eyes of the passenger. In this way, a time from generation of inclination of the vehicle 80 to completion of rotation of the display unit 14 can be shortened. Moreover, although a case has been described in which the inclination information of the vehicle 80 is stored and the tilt of the display unit 14 is controlled by using the inclination information, instead of the inclination information, centrifugal force information which can be calculated from an operating speed of the vehicle 80, a curve shape of rails on which the vehicle 80 travels and so on may be utilized, so that the angle of the swing of the hanging strap 10 is predicted, the display unit 14 according to the predicted value is tilted, and the direction of the information display surface 14a of the display unit 14 is directed to the position that is assumed to be the position of the eyes of the passenger.

Moreover, it is also possible to employ simultaneously both of the control of the tilt of the display unit 14 based on the inclination degree information that can be predicted in advance in this way and the control of the tilt of the display unit 14 based on the inclination degree detected by the inclination degree sensor 31 (the control in the above first to fourth embodiments), and it is also possible to be configured so as to switch and select one of the controls. In this way, while the inclination of the vehicle can be addressed promptly, the inclination of the hanging strap generated by motion of the passenger 90 that is gripping the hanging strap can also be addressed.

As described above, according to the hanging-strap information display device 5 according to the fifth embodiment, the display unit 14 tilts when the hanging strap swings and inclines in the direction away from the passenger 90 that squarely faces the information display surface 14a of the display unit 14 or in the direction of approaching the passenger 90, and therefore the direction of the information display surface 14a of the display unit 14 is set at an angle at which it is easy for the passenger 90 to perform visual recognition even if the passenger 90 does not move his face.

Sixth Embodiment

Figure 23:
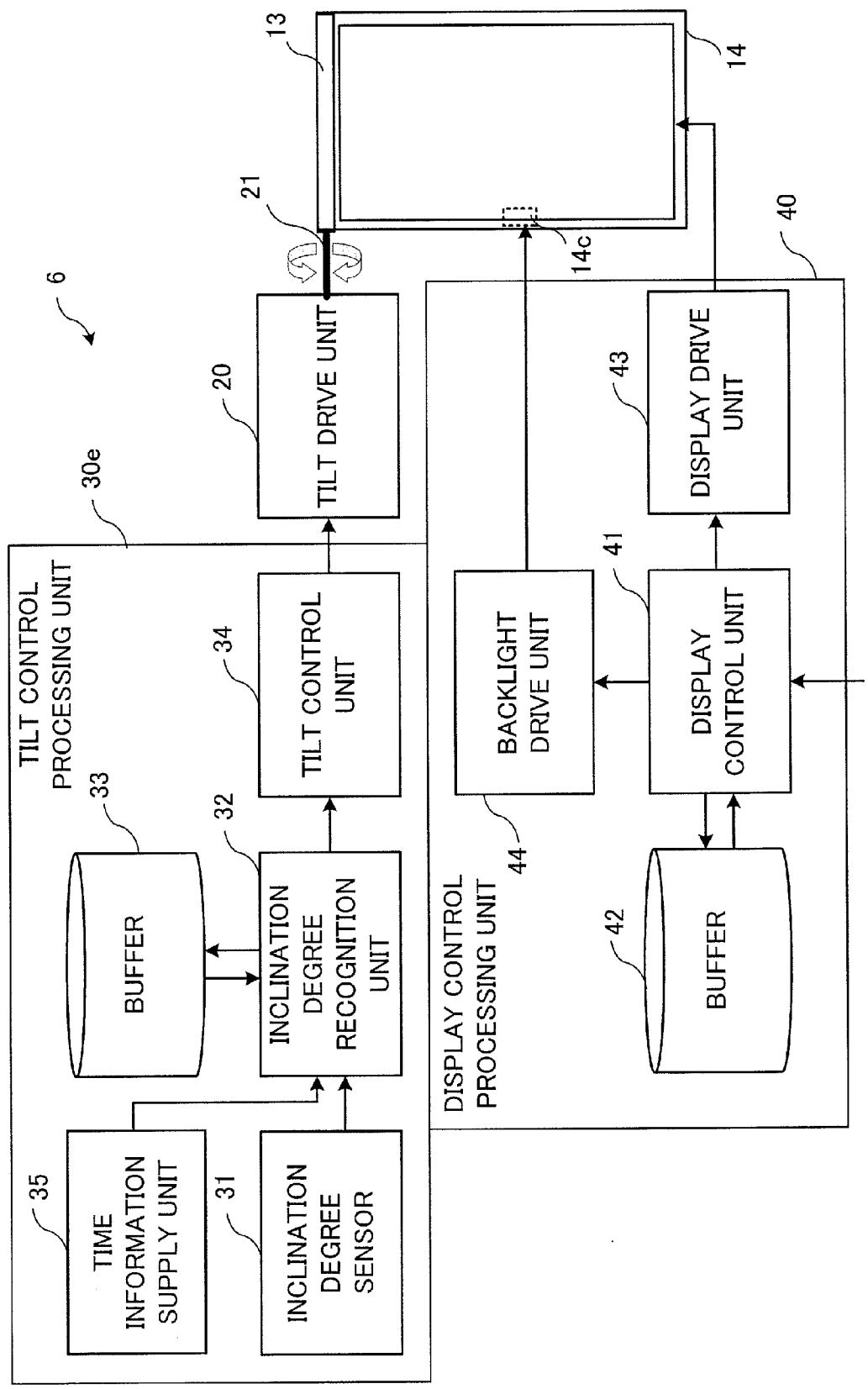
FIG. 23 is a block diagram schematically illustrating a configuration of a hanging-strap information display device according to a sixth embodiment of the present invention.

FIG. 23 is a block diagram schematically illustrating a configuration of a hanging-strap information display device 6 according to a sixth embodiment of the present invention. In FIG. 23, components that are the same as or corresponding to the components shown in FIG. 6 (the first embodiment) and FIG. 18 (the third embodiment) are assigned the same reference characters as the reference characters shown in FIG. 6. In the third embodiment, presence or absence of the passenger 90 is detected by using the contact sensor 51, but in the sixth embodiment presence or absence of the passenger 90 that grips the hold part 12 of the hanging strap 10 is detected by using how the hanging strap 10 swings. The hanging strap 10 that is not gripped by the passenger 90 swings leftward and rightward (for example, the +y axis direction and the −y axis direction) cyclically to a certain degree like a pendulum, because of the swing of the vehicle 80. That is, in a case where the detected inclination degree is regular or cyclic to have a cycle within a certain predetermined range, and swinging widths have substantially the same amplitude between the left and the right (in a case where the difference between the left and right amplitudes is equal to or smaller than a predetermined threshold value), it can be determined that the hanging strap 10 is not gripped by the passenger 90. In the sixth embodiment, by using such a principle, the inclination degree recognition unit 32 in a tilt control processing unit 30e determines presence or absence of the passenger 90 from an output of the inclination degree sensor 31. With regard to other points, the sixth embodiment is substantially the same as the third embodiment.

As described above, the hanging-strap information display device 6 according to the sixth embodiment can recognize whether or not the hanging strap 10 is gripped by the passenger 90, and can perform the tilt control process or the information display process only in a case where the hanging strap 10 is gripped. Moreover, the backlight of the display unit 14 provided in the hanging strap 10 that is not gripped by the passenger 90 can also be turned off, so that no information is displayed. Thereby, electric power consumption in the hanging-strap information display device 6 that is not gripped by the passenger 90 can be reduced.

Seventh Embodiment

Figure 24A:
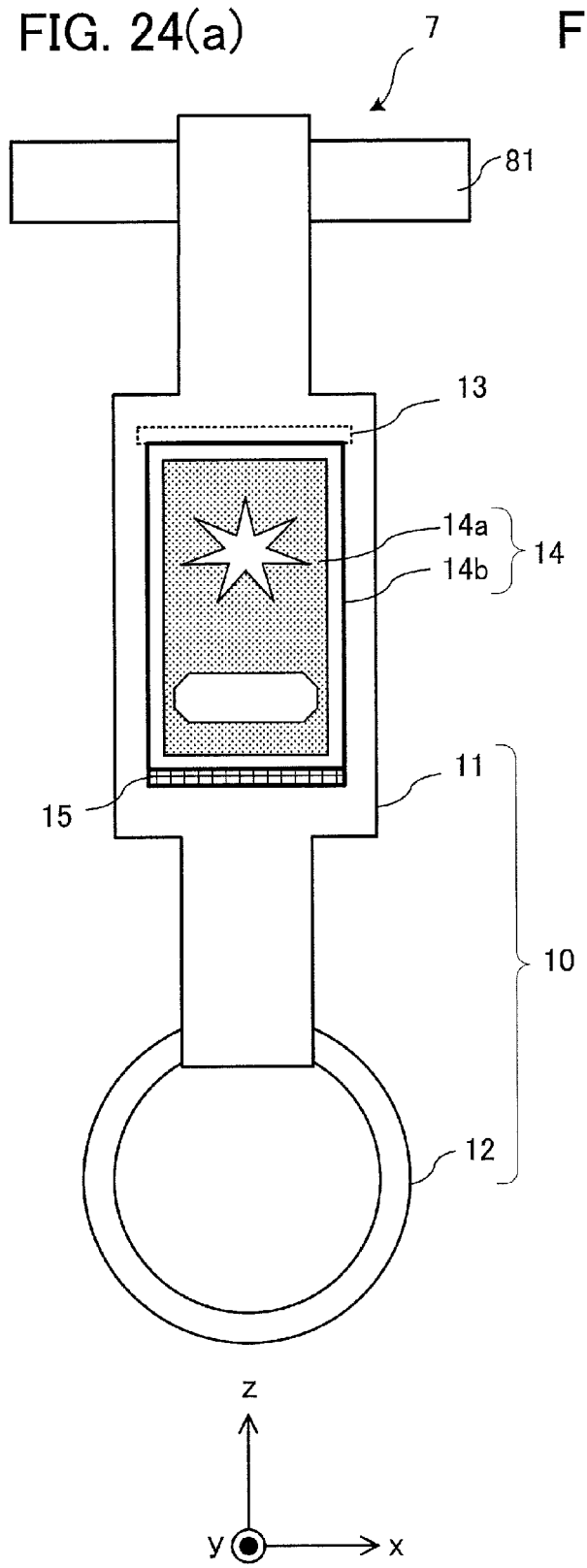
FIGS. 24(a) and 24(b) are a front view and a side view schematically illustrating an exterior appearance of a hanging-strap information display device according to a seventh embodiment of the present invention.
Figure 24B:
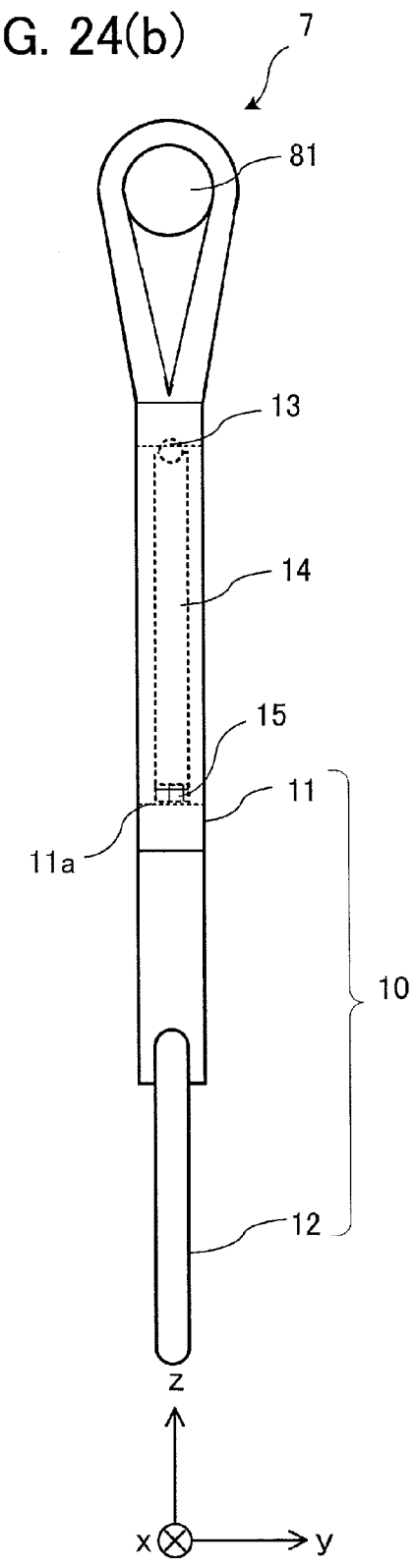
Figure 25:
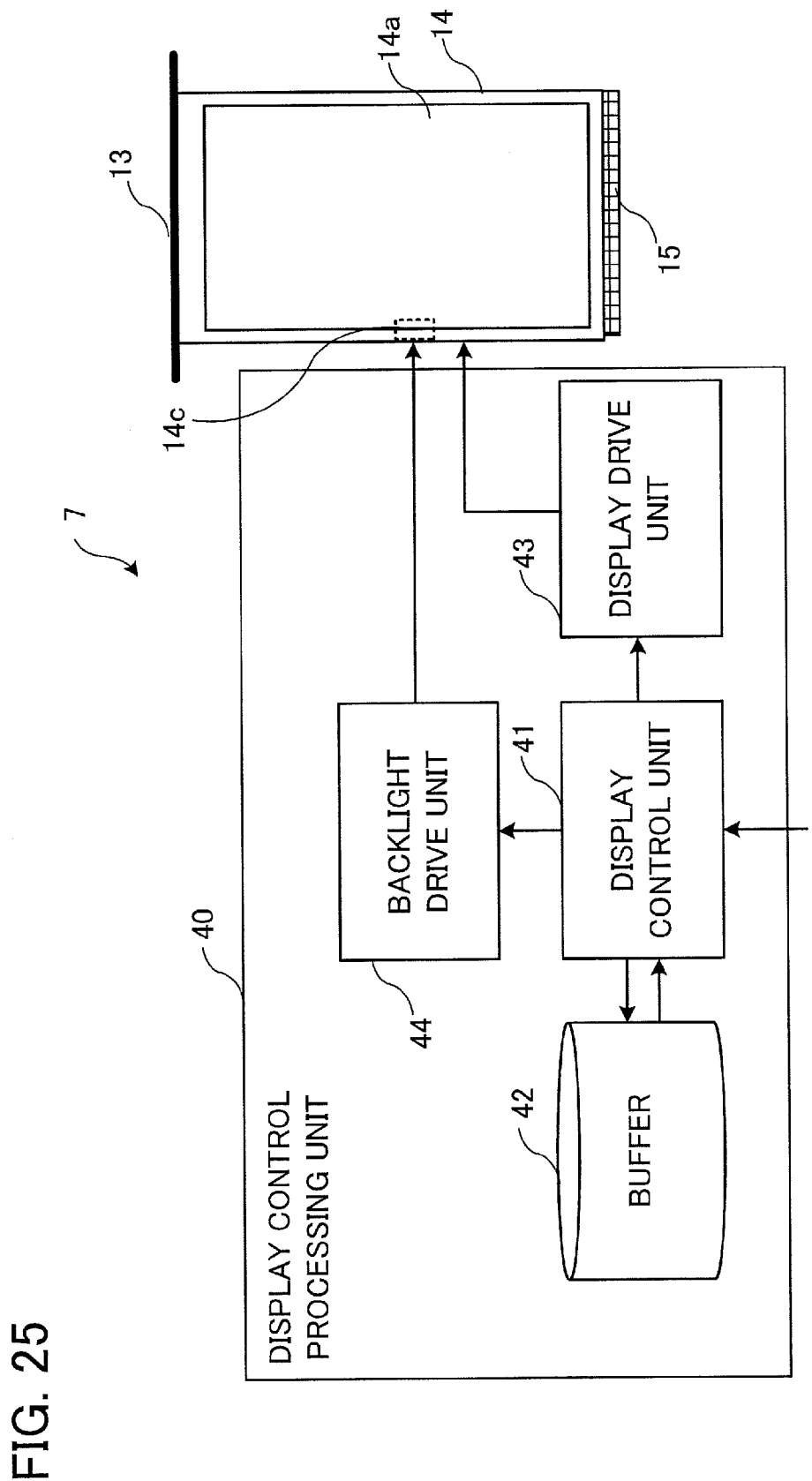
FIG. 25 is a block diagram schematically illustrating a configuration of the hanging-strap information display device according to the seventh embodiment.

FIGS. 24(a) and 24(b) are a front view and a side view schematically illustrating an exterior appearance of a hanging-strap information display device 7 according to a seventh embodiment of the present invention. In FIGS. 24(a) and 24(b), components that are the same as or corresponding to the components shown in FIGS. 1(a) and 1(b) (the first embodiment) are assigned the same reference characters as the reference characters shown in FIGS. 1(a) and 1(b). Moreover, FIG. 25 is a block diagram schematically illustrating the configuration of the hanging-strap information display device 7 according to the seventh embodiment. In FIG. 25, components that are the same as or corresponding to the components shown in FIG. 6 (the first embodiment) are assigned the same reference characters as the reference characters shown in FIG. 6. As can be understood from FIGS. 24(a) and 24(b) and FIG. 25, the hanging-strap information display device 7 according to the seventh embodiment is different from the hanging-strap information display device 1 according to the first embodiment, in that the display unit 14 is provided in a tiltable manner (rotatable manner) on the hanging band part 11 by the support shaft part 13, and the tilt control processing unit 30 in the first embodiment is not provided, and the lower end of the display unit 14 is at the lowest position in the vertically downward direction (−z axis direction) due to gravity force. With regard to other points, the seventh embodiment is substantially the same as the first embodiment. In the following explanation, FIGS. 4(a) and 4(b) are also referred to.

As illustrated in FIGS. 24(a) and 24(b), the hanging-strap information display device 7 according to the seventh embodiment may include a weight 15 on a lower side in the vertical direction than the rotation center line 13a of the display unit 14, specifically at the lower end of the display unit 14. The hanging-strap information display device 7 is provided with the weight 15 at the lower end of the display unit 14. Thereby, in the display unit 14, its lower portion is heavier as compared with its upper portion. The heft of the weight 15 can be selected freely, if the display unit 14 hung in a tiltable manner can keep its attitude stably.

Figure 26:
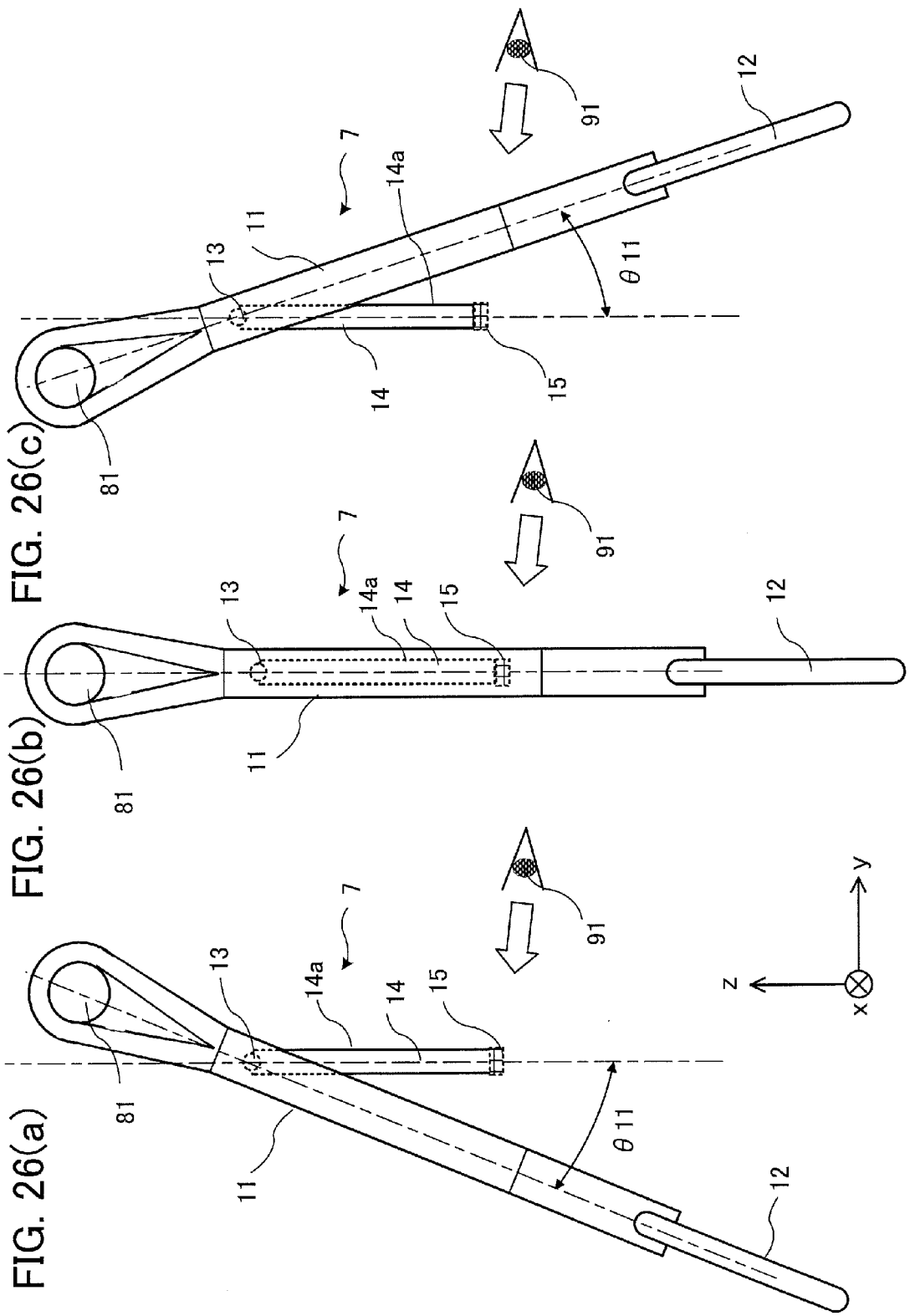
FIGS. 26(a) to 26(c) are side views illustrating a tilt of a display unit in a state in which the hanging-strap information display device according to the seventh embodiment swings and inclines in the direction away from the passenger, in a state in which it does not incline, and in a state in which it swings and inclines in the direction of approaching the passenger.

FIGS. 26(a) to 26(c) are side views illustrating tilt of the display unit 14 in a state in which the hanging band part 11 of the hanging strap 10 of the hanging-strap information display device 7 according to the seventh embodiment swings and inclines in the direction away from the passenger 90, in a state in which the hanging band part 11 does not incline, and in a state in which the hanging band part 11 swings and inclines in the direction of approaching the passenger 90. As illustrated in the drawings, the display unit 14 can continuously keep the normal direction of the information display surface 14a in the horizontal direction, even if the hanging band part 11 of the hanging strap 10 swings and the inclination degree θ11 changes.

As described above, the hanging-strap information display device 7 according to the seventh embodiment is provided with the display unit 14 in a tiltable manner (swingable manner) even in a case where the hanging strap 10 inclines in the depth direction (y axis direction) by how the passenger 90 grips the hold part 12 of the hanging strap 10 or how the vehicle inclines, and therefore can keep the attitude in which the lower end of the display unit 14 is at a position in the vertical direction. Thereby, the squarely facing passenger 90 can keep a state in which it is easy to perform visual recognition of the information displayed on the display unit 14.

Eighth Embodiment

Figure 27:
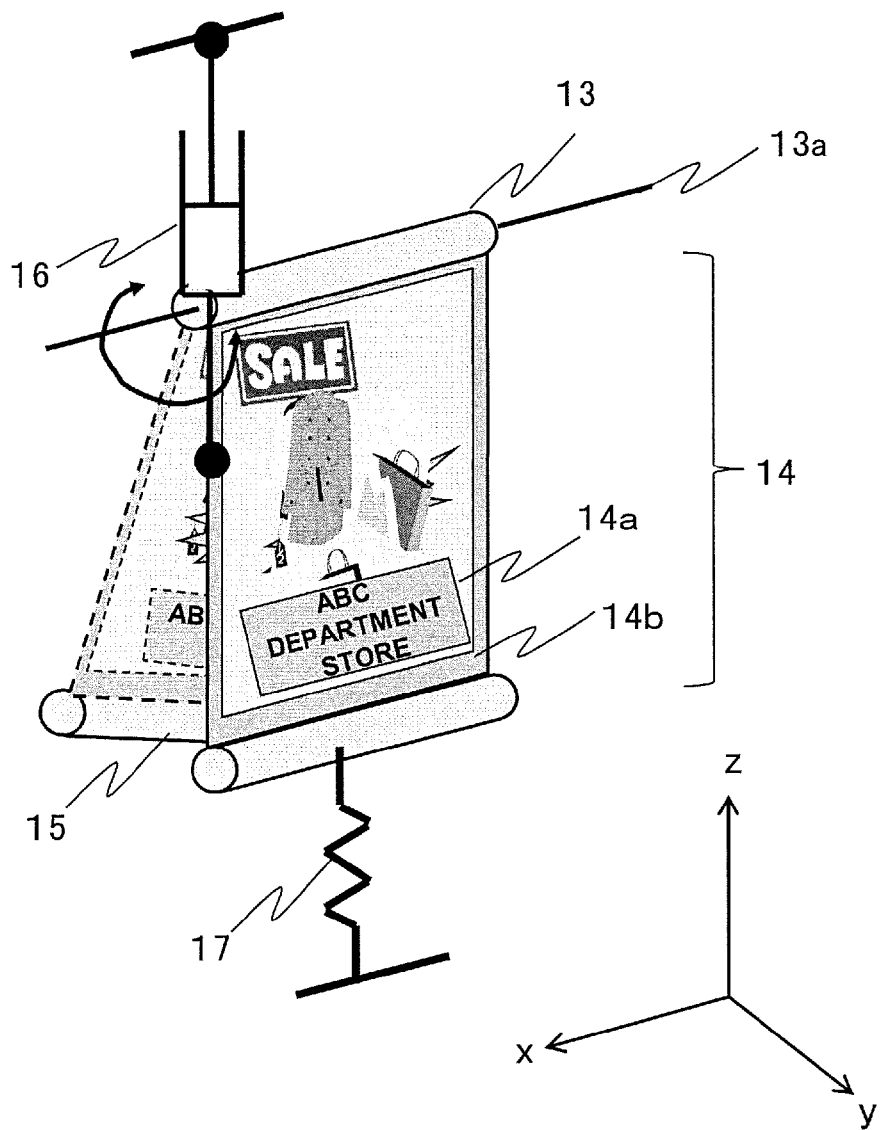
FIG. 27 is a perspective view illustrating a tilt of a display unit of a hanging-strap information display device according to an eighth embodiment.
Figure 28:
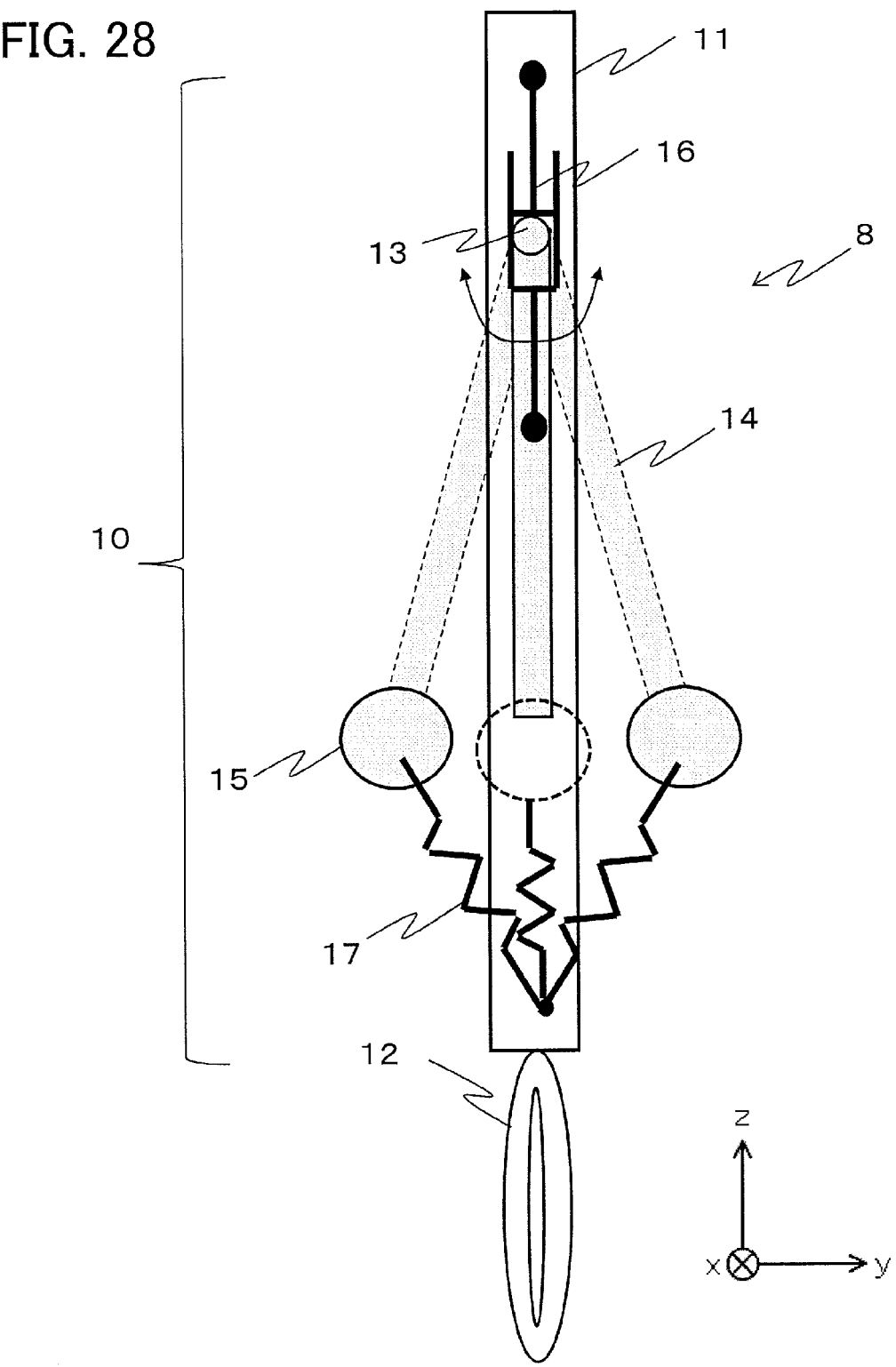
FIG. 28 is a side view illustrating the tilt of the display unit installed, in a freely rotatable manner, in a hanging band part of the hanging-strap information display device according to the eighth embodiment.
Figure 29:
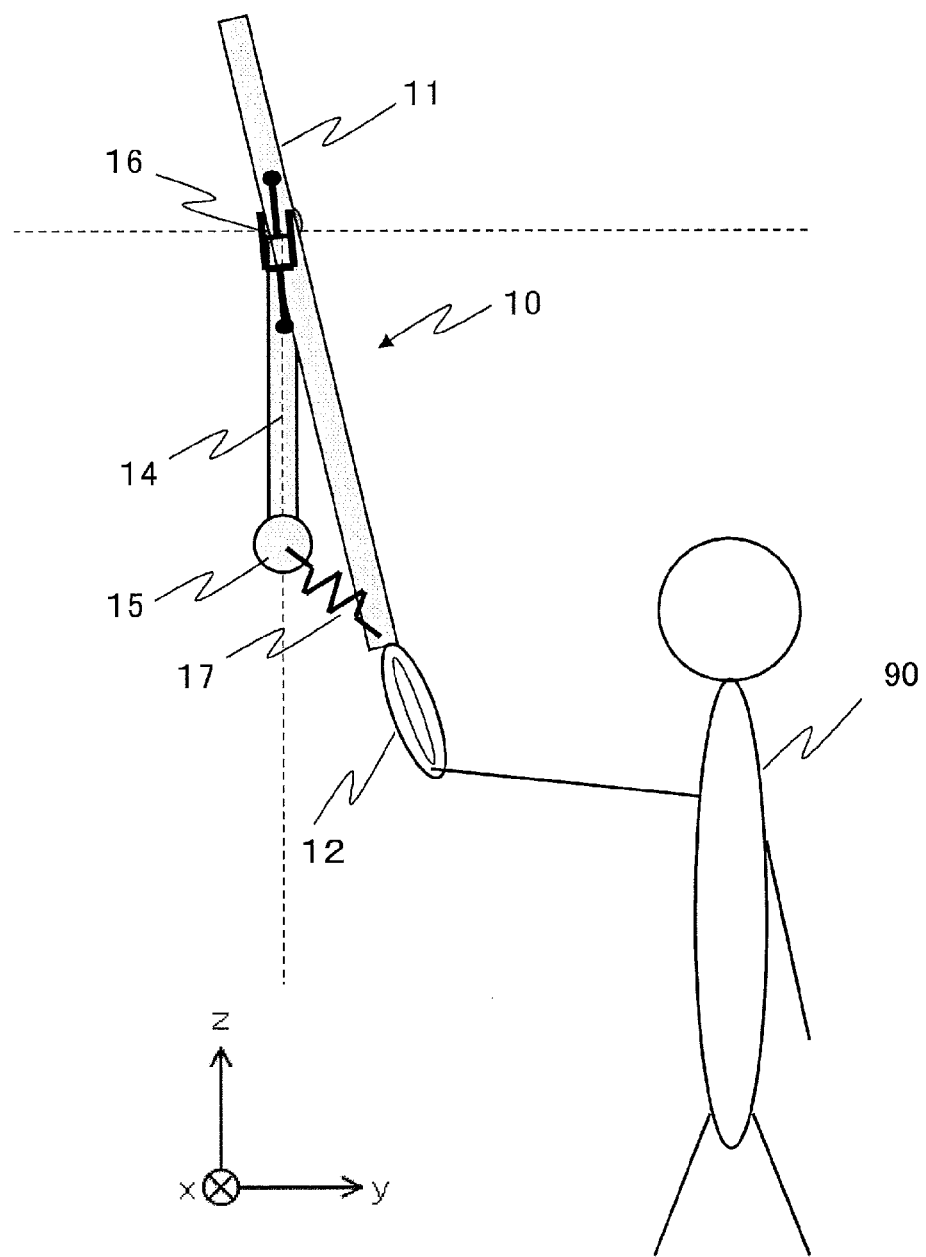
FIG. 29 is an overall view illustrating a positional relationship between a side view of the hanging-strap information display device according to the eighth embodiment and a passenger.

FIG. 27 is a perspective view illustrating the display unit 14 of a hanging-strap information display device 8 according to an eighth embodiment of the present invention. FIG. 28 is a side view illustrating rotation of the display unit 14 installed, in a freely rotatable manner, in the hanging band part 11 of the hanging-strap information display device 8 according to the eighth embodiment. FIG. 29 is a diagram schematically illustrating a positional relationship between the hanging-strap information display device 8 according to the eighth embodiment and the passenger 90.

As illustrated in FIG. 27, FIG. 28, and FIG. 29, the hanging-strap information display device 8 according to the eighth embodiment is an hanging-strap information display device 10 including the hanging band part 11 and the hold part (the grip part) 12 included in the hanging band part 11. The hanging-strap information display device 8 includes the display unit 14 disposed at a position that squarely faces the passenger that grips the hold part 12, the support shaft part 13 that supports the display unit 14 on the hanging band part 11 in a rotatable (tiltable) manner about the rotation center line 13a, the weight 15 provided on the lower side in the vertical direction than the rotation center line 13a of the display unit 14, and a resonance reduction member connected between the hanging band part 11 and a position away from the rotation center line 13a of the display unit 14. For example, the resonance reduction member includes at least one of a damper 16 as a vibration absorbing member connected between the hanging band part 11 and a side edge in the vertical direction of the display unit 14 and a spring 17 as an elastic member (a resonance frequency change member) connected between the hanging band part 11 and a lower end edge of the display unit 14. However, the hanging-strap information display device may be configured with the hanging strap 10, the display unit 14, and the support shaft part 13. Further, a pair of or a plurality of pairs of dampers 16 may be provided at both side edges in the vertical direction of the display unit 14. Moreover, a plurality of springs 17 may be provided.

Moreover, as illustrated in FIGS. 4(a) and 4(b) which have been described already, the hanging band part 11 of the hanging strap 10 is hung in a swingable manner on the support structural object 81 in the movable body 80. The display unit 14 includes the information display surface 14a and the bezel (the frame body) 14b that surrounds this. In general, the information display surface 14a of the display unit 14 is disposed substantially at a position that squarely faces the passenger 90 that grips the hold part 12 of the hanging strap 10 (including a position that is a little higher than the position of the eyes 91 of the passenger 90).

Normally, the display unit 14 is a device that can display an image based on input image data. The image data may be input from a server device inside the vehicle or outside the vehicle by wire or wireless, and also may be stored in a memory unit provided in each of the display units 14 in advance. For example, the display unit 14 can be configured with any of a liquid crystal display device, an organic EL display device, and electronic paper that can electrically rewrite displayed content. Moreover, the display unit 14 may include the backlight 14c. If the display unit 14 is configured to be able to present an image to the passenger 90, the display unit 14 is not limited to the above illustrated devices, but may be other configurations.

FIG. 28 is a main part side view schematically illustrating a configuration of the hanging-strap information display device 8 according to the eighth embodiment. The support shaft part 13 is a member having a longitudinal direction in the horizontal direction (x axis direction). As illustrated in FIG. 28, the support shaft part 13 supports the display unit 14 in a swingable manner, in the opening 11a of the hanging band part 11 of the hanging strap 10. It is desirable that a swingable angle range be within a range from 90 degrees in the direction away from the passenger 90 (−y direction) (i.e., the angle θa=−90 degrees in FIG. 3) to 90 degrees in the direction of approaching the passenger 90 (+y direction) (i.e., the angle θb=+90 degrees in FIG. 3) with reference to the vertical direction (z axis direction). However, a swingable maximum angle may be a smaller value than 90 degrees. Moreover, the display unit 14 is configured to be able to get still at an arbitrary position within the range of the swingable maximum angle. For example, in the case of θa=−90 degrees and θb=+90 degrees, a swing angle θ of the display unit 14 is within the range from −90 degrees to 90 degrees. Further, getting still, which is referred to here, means that the display unit 14 does not swing together with the swinging hanging strap 10, but the display unit 14 hardly swings even if the hanging strap 10 swings, and the display unit 14 keeps being hung in the substantially gravity force direction (substantially vertically downward direction) (i.e., remains still in the same attitude with reference to the gravity force direction).

Although a method in which the display unit 14 is fixed to the support shaft part 13 and the display unit 14 is swung by the rotation of the support shaft part 13 has been described as a method of supporting the display unit 14 in the hanging band part 11 in a swingable manner, a method of supporting the display unit 14 is not limited thereto. For example, the configuration that the support shaft part 13 is a fixed shaft and the display unit 14 is supported on the fixed shaft in a rotatable manner is also possible.

As illustrated in FIG. 27, FIG. 28, and FIG. 29, the hanging-strap information display device 8 is tilted, so that an axis line in the vertical direction of the display unit 14 is directed in the vertically downward direction in accordance with force in the gravity force direction, even in a case where the hanging strap swings by the weight 15 provided on the lower side in the vertical direction than the rotation center line (13a in FIG. 3) of the display unit 14, which tilts the display unit 14 relative to the hanging band part 11 within a predetermined angle range about the rotation center line 13a. It is possible that the display unit 14 including the weight 15 swings continuously about the rotation center line 13a at a resonance frequency by the principle of pendulum. The damper 16 is provided to avoid a situation in which such swing having the resonance frequency continues, the swing is further amplified, the swing does not stop, and it becomes difficult for the display unit 14 to maintain a state in which it is hung in the gravity force direction. The damper 16 has a function to reduce the amplitude of the resonance at the resonance frequency.

The spring 17 exerts force that attracts the lower end of the display unit 14 to the hanging band part 11, on the lower end of the display unit 14. The resonance frequency of the display unit 14 can be shifted, by employing one having an appropriate spring coefficient as the spring 17. The frequency of a swing of an electric train provided with the hanging-strap information display device 8 is predictable, and thus the resonance frequency of the display unit 14 can be made different from the frequency of the swing of the electric train, by employing the one having the appropriate spring coefficient, as the spring 17.

FIGS. 30(a) to 30(c) are side views illustrating a rotation of the display unit 14 in a state in which the hanging-strap information display device 8 according to the eighth embodiment swings and inclines in the direction away from the position of the eyes 91 of the passenger 90, in a state in which it does not incline, and in a state in which it swings and inclines in the direction of approaching the passenger 90. In the cases of FIGS. 30(a) and 30(c), the spring 17 is stretched, and the spring 17 attracts the lower end of the display unit 14 to the hanging band part 11, but the role of the spring 17 is to shift (change) the resonance frequency of the display unit 14, and if the spring coefficient is set small, the inclination amount of the display unit 14 by the spring 17 can be made smaller (the attitude hardly inclines). With these configurations, the normal direction of the information display surface 14a can be continuously set in the horizontal direction, without having an elaborate drive unit and detection unit. Moreover, as illustrated in FIGS. 30(a) to 30(c), the damper 16 is compressed and stretched to reduce vibration of the display unit 14.

As described above, the hanging-strap information display device 8 according to the eighth embodiment is provided with the display unit 14 in a tiltable manner (swingable manner) even in a case where the hanging strap 10 inclines in the depth direction (y axis direction) by how the passenger 90 grips the hold part 12 of the hanging strap 10 or how the vehicle inclines, and therefore can keep the attitude in which the lower end of the display unit 14 is at a position in the vertical direction. Thereby, the squarely facing passenger 90 can keep a state in which it is easy to perform visual recognition of the information displayed on the display unit 14.

DESCRIPTION OF REFERENCE CHARACTERS 1 to 8 hanging-strap information display device; 10 hanging strap; 11 hanging band part; 11a opening; 12 hold part; 13 support shaft part; 13a rotation center line; 14 display unit; 14a information display unit; 14b bezel (frame body); 14c backlight; 15 weight; 16 damper (vibration absorbing member, resonance reduction member); 17 spring (resonance frequency change member, resonance reduction member); 20 tilt drive unit; 21 rotation shaft; 30, 30a to 30e tilt control processing unit; 31 inclination degree sensor; 32 inclination degree recognition unit; 33 buffer; 34 tilt control unit; 35 time information supply unit; 36 inclination-degree information storage unit; 37 traveling-position information acquisition unit; 40 display control processing unit; 41 display control unit; 42 buffer; 43 display drive unit; 44 backlight drive unit; 50, 60 passenger detection unit; 51 contact sensor; 52 contact recognition unit; 61 infrared sensor; 62 recognition unit; 80 vehicle (movable body); 81 support member; 90 passenger; 91 eye; Av vertical axis.

What is claimed is:

1. A hanging-strap information display device provided in a hanging strap including a hanging band part hung in a movable body in a swingable manner and a hold part provided on the hanging band part, the hanging-strap information display device comprising:
    a display unit including an information display surface;
    a support shaft part that supports the display unit on the hanging band part in a rotatable manner about a rotation center line;
    a weight provided on a lower side in a vertical direction than the rotation center line of the display unit; and
    a resonance reduction member that is connected between the hanging band part and a position away from the rotation center line of the display unit, and reduces resonance of the display unit.

2. The hanging-strap information display device according to claim 1, wherein
    the resonance reduction member includes at least one of a damper connected between the hanging band part and an edge in the vertical direction of the display unit and a spring connected between the hanging band part and a lower end edge of the display unit.

3. A hanging-strap information display device provided in the hanging strap including a hanging band part hung in a movable body in a swingable manner and a hold part provided on the hanging band part, the hanging-strap information display device comprising:
    a display unit including an information display surface;
    a support shaft part that supports the display unit on the hanging band part in a tiltable manner about a rotation center line;
    a tilt drive unit that tilts the display unit about the rotation center line;
    an inclination degree sensor that detects an inclination degree of the hanging band part, the inclination degree being generated by swing motion in a depth direction that is orthogonal to both of a vertical direction and a longitudinal direction of the rotation center line; and
    a tilt control unit that decides an angle of the tilt of the display unit by the tilt drive unit on a basis of the inclination degree detected by the inclination degree sensor, and supply an instruction signal indicating the decided angle of the tilt to the tilt drive unit.

4. The hanging-strap information display device according to claim 3, wherein
    the decision of the angle of the tilt by the tilt control unit is performed on a basis of a plurality of inclination degrees obtained by a plurality of times of detection by the inclination degree sensor.

5. The hanging-strap information display device according to claim 3, further comprising:
    a time information supply unit that supplies time information indicating a current time; and
    an inclination degree recognition unit that calculates an average value of a plurality of inclination degrees within a predetermined time, from the plurality of inclination degrees obtained by a plurality of times of detection by the inclination degree sensor and detection times of the plurality of inclination degrees supplied from the time information supply unit,
    wherein the decision of the angle of the tilt by the tilt control unit is performed on a basis of the average value calculated by the inclination degree recognition unit.

6. The hanging-strap information display device according to claim 3, further comprising:
    a time information supply unit that supplies time information indicating a current time; and
    an inclination degree recognition unit that calculates a median value of a plurality of inclination degrees within a predetermined time, from the plurality of inclination degrees obtained by a plurality of times of detection by the inclination degree sensor and detection times of the plurality of inclination degrees supplied from the time information supply unit,
    wherein the decision of the angle of the tilt by the tilt control unit is performed on a basis of the median value calculated by the inclination degree recognition unit.

7. The hanging-strap information display device according to claim 3, further comprising:
    a traveling-position information acquisition unit that acquires traveling position information indicating a traveling position of the movable body; and
    an inclination information storage unit that stores inclination information indicating an inclination of the movable body that is generated at each spot of the traveling position acquired by the traveling-position information acquisition unit,
    wherein the decision of the angle of the tilt by the tilt control unit is performed on a basis of the inclination degree detected by the inclination degree sensor and the inclination information of the movable body that is generated at each spot of the traveling position and stored in the inclination information storage unit.

8. The hanging-strap information display device according to claim 5, further comprising:
    a traveling-position information acquisition unit that acquires traveling position information indicating a traveling position of the movable body; and
    an inclination information storage unit that stores inclination information indicating an inclination of the movable body that is generated at each spot of the traveling position acquired by the traveling-position information acquisition unit,
    wherein the decision of the angle of the tilt by the tilt control unit is performed on a basis of the average inclination degree calculated by the inclination degree recognition unit and the inclination information of the movable body that is stored in the inclination information storage unit.

9. The hanging-strap information display device according to claim 6, further comprising:

a traveling-position information acquisition unit that acquires traveling position information indicating a traveling position of the movable body; and an inclination information storage unit that stores inclination information indicating an inclination of the movable body that is generated at each spot of the traveling position acquired by the traveling-position information acquisition unit, wherein the decision of the angle of the tilt by the tilt control unit is performed on a basis of the median value calculated by the inclination degree recognition unit and the inclination information of the movable body that is stored in the inclination information storage unit.

10. The hanging-strap information display device according to claim 5, wherein the inclination degree recognition unit supplies, a notification signal indicating that a change of the inclination degree is cyclically repeated, to the tilt control unit, in a case where the change of the inclination degree detected by the inclination degree sensor is cyclically repeated, and the tilt control unit causes the tilt drive unit to stop the tilt of the display unit, when receiving the notification signal.

11. The hanging-strap information display device according to claim 3, further comprising a passenger detection unit that detects presence or absence of a passenger that squarely faces the information display surface of the display unit, and supplies a notification signal indicating a result of the detection to the tilt control unit, wherein the tilt control unit causes the tilt drive unit to stop the tilt of the display unit, when receiving the notification signal of absence of the passenger.

12. The hanging-strap information display device according to claim 11, wherein the passenger detection unit includes a contact sensor that detects whether or not the passenger touches the hold part of the hanging strap.

13. The hanging-strap information display device according to claim 12, wherein the contact sensor includes an electrostatic sensor disposed on a part or all of a surface of the hold part to detect contact of the passenger by detecting a change of electrostatic capacitance.

14. The hanging-strap information display device according to claim 11, wherein the passenger detection unit includes an infrared sensor that detects presence or absence of the passenger.

15. The hanging-strap information display device according to claim 3, wherein the display unit displays an image based on an input signal on the information display surface.

16. The hanging-strap information display device according to claim 3, wherein the display unit further includes another information display surface on an opposite side surface to the information display surface.

17. A hanging-strap information display device provided in the hanging strap including a hanging band part hung in a movable body in a swingable manner and a hold part provided on the hanging band part, the hanging-strap information display device comprising:

a display unit including an information display surface;

a support shaft part that supports the display unit on the hanging band part in a tiltable manner about a rotation center line;

a tilt drive unit that tilts the display unit about the rotation center line;

a traveling-position information acquisition unit that acquires traveling position information indicating a traveling position of the movable body;

an inclination information storage unit that stores position information indicating spots of the traveling positions that is acquired by the traveling-position information acquisition unit and inclination information indicating inclinations of the movable body that is generated at the spots; and a tilt control unit that decides an angle of the tilt of the display unit by the tilt drive unit on a basis of the inclination information of the movable body that is stored in the inclination information storage unit, and supply an instruction signal indicating the decided angle of the tilt to the tilt drive unit.

\* \* \* \* \*